US012611638B2

(12) United States Patent
Beedie et al.

(10) Patent No.: US 12,611,638 B2
(45) Date of Patent: Apr. 28, 2026

(54) RATCHET SYSTEM FOR A GAS CANISTER IN A BEVERAGE SYSTEM

(71) Applicant: SharkNinja Operating LLC, Needham, MA (US)

(72) Inventors: Jemma Beedie, London (GB); Jack Richardson, Yorkshire (GB)

(73) Assignee: SharkNinja Operating LLC, Needham, MA (US)

( * ) Notice: Subject to any disclaimer, the term of this patent is extended or adjusted under 35 U.S.C. 154(b) by 309 days.

(21) Appl. No.: 18/493,031

(22) Filed: Oct. 24, 2023

(65) Prior Publication Data

US 2025/0128213 A1 Apr. 24, 2025

(51) Int. Cl.
*B01F 23/236* (2022.01)
*A23L 2/54* (2006.01)
(Continued)

(52) U.S. Cl.
CPC ............ *B01F 23/2363* (2022.01); *A23L 2/54* (2013.01); *B01F 23/2362* (2022.01);
(Continued)

(58) Field of Classification Search
CPC .... A23L 2/54; B01F 2101/14; B01F 23/2362; B01F 23/2363; B01F 23/237621;
(Continued)

(56) References Cited

U.S. PATENT DOCUMENTS 691,881 A * 1/1902 Thompson et al. ..... B67D 7/22
235/94 R
1,556,837 A * 10/1925 Huntley .................... B67C 3/26
141/54
(Continued)

FOREIGN PATENT DOCUMENTS

CN 104971413 A 10/2015
CN 111637291 A 9/2020
(Continued)

OTHER PUBLICATIONS

U.S. Appl. No. 17/821,212 entitled "Beverage Carbonation System Flow Control", filed on Aug. 22, 2022, 43 pages.
(Continued)

*Primary Examiner* — Christopher M Afful
(74) *Attorney, Agent, or Firm* — Mintz, Levin, Cohn, Ferris, Glovsky and Popeo, P.C. US

(57) ABSTRACT

Various systems, devices, and methods for a ratchet system for a gas canister in a beverage system are provided. In general, a beverage system is configured to form a beverage and dispense the beverage into a container. The beverage system can be a carbonation system configured to form a carbonated fluid and dispense the carbonated fluid into a container. In an exemplary embodiment, the beverage system includes a ratchet system configured to provide feedback to a user indicating that a gas source, such as a $CO_2$ canister for a carbonation system, has been properly coupled to the beverage system. The feedback is configured to be provided to the user automatically in response to the gas source being properly coupled to the beverage system.

20 Claims, 30 Drawing Sheets

(51) Int. Cl.
B01F 23/237 (2022.01)
B01F 101/14 (2022.01)
B67D 1/00 (2006.01)

(52) U.S. Cl.
CPC .... B01F 23/237621 (2022.01); B67D 1/0069 (2013.01); *B01F 2101/14* (2022.01)

(58) Field of Classification Search
CPC .. B67D 1/0069; B67D 1/0082; B67D 1/1466; B67D 1/0418; B67D 1/0891; B67D 1/0857; B67D 1/0804; B67D 1/0801; B67D 2210/00036; B67D 2001/0824; B67D 2001/0089; B65D 83/38; B65D 83/44; B65D 83/72
USPC ............................................................ 141/6
See application file for complete search history.

(56) References Cited

U.S. PATENT DOCUMENTS

| | | | | |
|---|---|---|---|---|
| 2,028,651 | A | * | 1/1936 | Dagnall .................. F16K 13/04 |
| | | | | 244/107 |
| 8,550,742 | B2 | | 10/2013 | Leroyer |
| 9,127,706 | B2 | | 9/2015 | Leibfried et al. |
| 9,249,824 | B2 | | 2/2016 | Dundas et al. |
| 9,527,047 | B2 | | 12/2016 | Ring et al. |
| 9,810,375 | B2 | | 11/2017 | Rider et al. |
| 10,060,115 | B2 | | 8/2018 | Miller et al. |
| 10,392,171 | B2 | | 8/2019 | Pelamo |
| 10,906,013 | B2 | | 2/2021 | Cohen et al. |
| 11,149,883 | B2 | | 10/2021 | Gauss et al. |
| 11,278,851 | B2 | | 3/2022 | Wu et al. |
| 11,433,362 | B2 | | 9/2022 | Danieli et al. |
| 11,460,135 | B2 | | 10/2022 | Wehrmann |
| 11,479,456 | B2 | | 10/2022 | Wood et al. |
| 11,612,865 | B1 | | 3/2023 | Reisner-Stehman et al. |
| 11,623,815 | B2 | * | 4/2023 | Magness ................ B65D 83/38 |
| | | | | 222/153.09 |
| 11,745,996 | B1 | | 9/2023 | Zbedlick |
| 11,751,585 | B1 | | 9/2023 | Anthony et al. |
| 2021/0213271 | A1 | | 7/2021 | Iwakata et al. |
| 2022/0218142 | A1 | | 7/2022 | Guan |
| 2023/0015919 | A1 | | 1/2023 | Root |
| 2023/0109966 | A1 | | 4/2023 | Deslandes et al. |
| 2023/0265952 | A1 | | 8/2023 | Ansell |

FOREIGN PATENT DOCUMENTS

| | | | | |
|---|---|---|---|---|
| CN | 115681787 | A | | 2/2023 |
| GB | 2124340 | A | * | 2/1984 .............. B67D 1/04 |
| WO | 2022200431 | A1 | | 9/2022 |

OTHER PUBLICATIONS

U.S. Appl. No. 18/099,690 entitled "Venting a Chamber in a Beverage Carbonation System", filed Jan. 20, 2023, 84 pages.
U.S. Appl. No. 18/099,712 entitled "Selectively Releasing Carbon Dioxide From a Gas Source in a Carbonation System", filed Jan. 20, 2023, 86 pages.
U.S. Appl. No. 18/364,776 entitled "Detecting Liquid Temperature for a Beverage Carbonation System", filed Aug. 3, 2023, 43 pages.
International Search Report and Written Opinion mailed for PCT Pat. App. No. PCT/US2024/052320 mailed Feb. 7, 2025. (14 pages).

* cited by examiner

Ratchet CW rotation

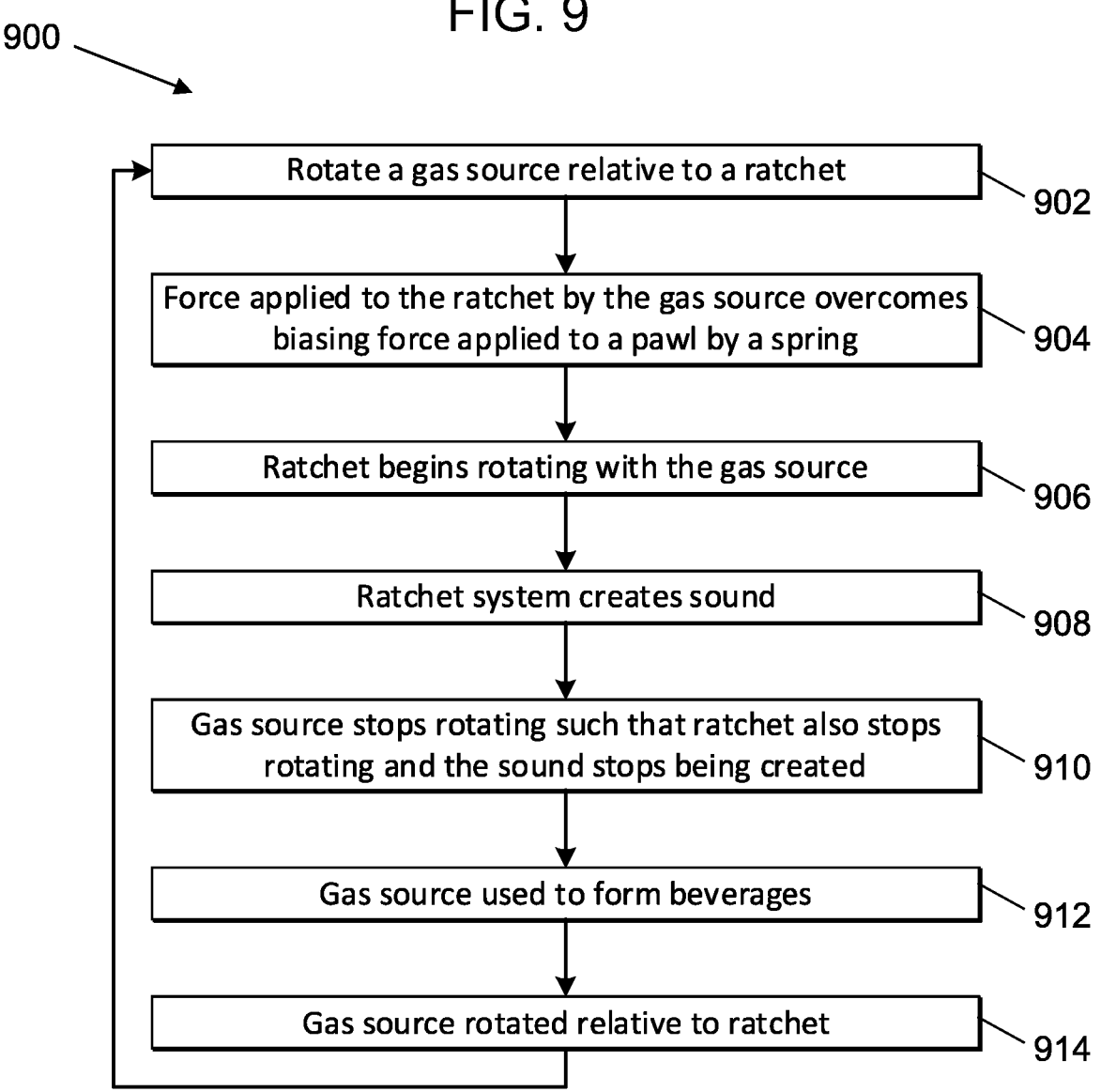

900

| | |
|---|---|
| Rotate a gas source relative to a ratchet | 902 |
| Force applied to the ratchet by the gas source overcomes biasing force applied to a pawl by a spring | 904 |
| Ratchet begins rotating with the gas source | 906 |
| Ratchet system creates sound | 908 |
| Gas source stops rotating such that ratchet also stops rotating and the sound stops being created | 910 |
| Gas source used to form beverages | 912 |
| Gas source rotated relative to ratchet | 914 |

RATCHET SYSTEM FOR A GAS CANISTER IN A BEVERAGE SYSTEM

FIELD

The present disclosure generally relates to a ratchet system for a gas canister in a beverage system.

BACKGROUND

Various beverage systems are available that dispense carbonated beverages, for example, carbonated water. In some instances, the carbonated water can be flavored. Such beverage systems can be used in various locations by consumers, such as in homes or offices, to carbonate liquid and dispense the carbonated fluid into a container on demand.

Beverage systems can provide the carbonated fluid by mixing in a mixing chamber carbon dioxide ($CO_2$) gas with water to dissolve the $CO_2$ in the water. The dissolution takes place at a significantly elevated pressure to reach the required concentration of dissolved $CO_2$. The carbonated fluid thereafter exits the mixing chamber for dispensing to a user.

The $CO_2$ can be supplied to the mixing chamber from a pressurized $CO_2$ canister removably coupled to the beverage system. Each time a carbonated fluid is formed, $CO_2$ is supplied from the canister to the mixing chamber, so an amount of $CO_2$ in the canister decreases. At some point the canister must be replaced so that a sufficient amount of $CO_2$ is available to form carbonated beverages with a satisfactory amount of carbonation. However, if the canister is not replaced properly, $CO_2$ from the new canister will not exit the canister and be supplied to the mixing chamber. Additionally, it can be difficult for a user to know when a canister has been properly coupled to the beverage system for any of one or more reasons. For example, a portion of the canister may be obscured from view while the canister is being coupled to the beverage system so the user cannot visually verify that the canister has been properly coupled to the beverage system.

Accordingly, there remains a need for improved devices, systems, and methods for beverage systems.

SUMMARY

In general, systems, devices, and methods for a ratchet system for a gas canister in a beverage system are provided.

In one aspect, a beverage system is provided that in one embodiment includes a spring, a pawl, and a ratchet. The pawl is operatively coupled to the spring such that the spring applies a first force to the pawl. The ratchet includes a plurality of teeth. The ratchet is configured to engage with a gas source containing a gas therein for formation of a beverage. The plurality of teeth are configured to engage the pawl. The pawl is configured to remain engaged with a first one of the plurality of teeth during the engagement of the ratchet with the gas source until a second force applied to the ratchet overcomes the first force, thereby causing the pawl to move to at least a second one of the plurality of teeth. The movement of the pawl from engaging the first one of the plurality of teeth of the ratchet to engaging at least the second one of the plurality of teeth creates a sound audible to a user engaging the gas source with the thread of the ratchet.

The beverage system can vary in any number of ways. For example, the ratchet can be configured to begin rotating in response to the second force overcoming the first force.

For another example, the ratchet can include a thread, engaging the ratchet with the gas source can include threadably engaging the thread with the gas source, the thread can be on an internal surface of the ratchet, and the plurality of teeth can be on an external surface of the ratchet.

For yet another example, the beverage system can also include a base to which the pawl is pivotally attached.

For another example, the ratchet can include a thread, and engaging the ratchet with the gas source can include threadably engaging the thread with the gas source.

For still another example, the ratchet can include a thread, engaging the ratchet with the gas source can include threadably engaging the thread with the gas source, and the pawl can be configured to move from engaging the first one of the plurality of teeth of the ratchet to engaging at least the second one of the plurality of teeth only with the thread of the ratchet fully threadably engaged with the gas source. Further, with the thread of the ratchet fully threadably engaged with the gas source, the gas contained in the gas source can be configured to be released therefrom for the formation of the beverage.

For another example, the ratchet can be configured to disengage from the gas source engaged therewith such that the ratchet is threadably engageable again with the gas source or is engageable with a second gas source.

For yet another example, the gas source can be a carbon dioxide canister containing carbon dioxide therein.

For another example, the beverage system can also include the gas source. Further, the ratchet can include a thread, engaging the ratchet with the gas source can include threadably engaging the thread with the gas source, the gas source can be configured to apply the second force to the ratchet only once the gas source has been fully threaded with the thread of the ratchet; an upper portion of the gas source can be configured to threadably engage the thread of the ratchet such that the gas source moves upward relative to the ratchet, and the gas source can be configured to begin applying the second force to the ratchet in response to the gas source being threadably engaged with the thread of the ratchet and moved as far upward as possible; and/or the gas source being threadably engaged with the thread of the ratchet can include the gas source being rotated relative to the ratchet, and the ratchet can be configured to begin rotating with the gas source in response to the second force being applied to the ratchet. Further, the gas contained in the gas source can be pressurized, the gas source can include a pin configured to move from an extended position, in which the gas source is closed such that the gas contained in the gas source cannot be released from the gas source, and a compressed position, in which the gas source is open such that the gas contained in the gas source can be released from the gas source, and the pin can be configured to move from the extended position to the compressed position in response to the gas source being fully threaded with the thread of the ratchet.

In another aspect, a method for a beverage system is provided. In one embodiment the beverage system includes a spring, a pawl, and a ratchet. The pawl is operatively coupled to the spring such that the spring applies a first force to the pawl. The ratchet includes a plurality of teeth. The ratchet is configured to engage with a gas source containing a gas therein for formation of a beverage. The plurality of teeth are configured to engage the pawl. The pawl is configured to remain engaged with a first one of the plurality of teeth during the engagement of the ratchet with the gas source until a second force applied to the ratchet overcomes the first force, thereby causing the pawl to move to at least a second one of the plurality of teeth. The movement of the pawl from engaging the first one of the plurality of teeth of the ratchet to engaging at least the second one of the plurality of teeth creates a sound audible to a user engaging the gas source with the thread of the ratchet. The method includes engaging the ratchet of the beverage system with the gas source until the second force applied to the ratchet overcomes the first force, thereby causing the pawl of the beverage system to move to at least the second one of the plurality of teeth and create the audible sound.

The method can vary in any number of ways. For example, the method can also include disengaging the ratchet from the gas source and, thereafter, threadably engaging the ratchet with a second gas source until a third force applied to the ratchet overcomes the first force, thereby causing the pawl to move to at least the second one of the plurality of teeth and create the audible sound.

For another example, the ratchet can include a thread, engaging the ratchet with the gas source can include threadably engaging the thread with the gas source, the thread can be on an internal surface of the ratchet, and the plurality of teeth can be on an external surface of the ratchet.

For yet another example, the beverage system can also include a base to which the pawl is pivotally attached.

For still another example, the ratchet can include a thread, engaging the ratchet with the gas source can include threadably engaging the thread with the gas source, and the pawl can be configured to move from engaging the first one of the plurality of teeth of the ratchet to engaging at least the second one of the plurality of teeth only with the thread of the ratchet fully threadably engaged with the gas source. Further, with the thread of the ratchet fully threadably engaged with the gas source, the gas contained in the gas source can be configured to be released therefrom for the formation of the beverage.

For another example, the ratchet can be configured to disengage from the gas source engaged therewith such that the ratchet is engageable again with the gas source or is engageable with a second gas source.

For yet another example, the gas source can be a carbon dioxide canister containing carbon dioxide therein.

For another example, the beverage system can also include the gas source. Further, the ratchet can include a thread, engaging the ratchet with the gas source can include threadably engaging the thread with the gas source, the gas source can be configured to apply the second force to the ratchet only once the gas source has been fully threaded with the thread of the ratchet; an upper portion of the gas source can be configured to threadably engage the thread of the ratchet such that the gas source moves upward relative to the ratchet, and the gas source can be configured to begin applying the second force to the ratchet in response to the gas source being threadably engaged with the thread of the ratchet and moved as far upward as possible; and/or the gas source being threadably engaged with the thread of the ratchet can include the gas source being rotated relative to the ratchet, and the ratchet can be configured to begin rotating with the gas source in response to the second force being applied to the ratchet. Further, the gas contained in the gas source can be pressurized, the gas source can include a pin configured to move from an extended position, in which the gas source is closed such that the gas contained in the gas source cannot be released from the gas source, and a compressed position, in which the gas source is open such that the gas contained in the gas source can be released from the gas source, and the pin can be configured to move from the extended position to the compressed position in response to the gas source being fully threaded with the thread of the ratchet.

For yet another example, the ratchet can include a thread, and engaging the ratchet with the gas source can include threadably engaging the thread with the gas source.

In another embodiment, a method for a beverage system includes rotating a gas source relative to a ratchet of a beverage system such that the gas source engages with the ratchet. The gas source contains a pressurized gas therein configured to be selectively released from the gas source to allow the beverage system to form a beverage using the released gas and to dispense the beverage. The gas source rotates relative to the ratchet until a force applied by the gas source to the ratchet overcomes a biasing force applied to a pawl engaged with one of a plurality of teeth of the ratchet, thereby causing the ratchet to begin rotating with the gas source such that the pawl moves to at least a second one of the plurality of teeth and creates a sound audible to a user rotating the gas source.

The method can vary in any number of ways. For example, the method can also include disengaging the gas source from the ratchet and, thereafter, rotating a second gas source relative to the ratchet such that the second gas source engages with the ratchet, the second gas source can contain a second pressurized gas therein configured to be selectively released from the second gas source to allow the beverage system to form a second beverage using the released second gas and to dispense the second beverage, and the second gas source can rotate relative to the ratchet until a second force applied by the second gas source to the ratchet overcomes the biasing force applied to the pawl, thereby causing the ratchet to begin rotating with the second gas source such that a second sound audible is created.

For another example, the method can also include disengaging the gas source from the ratchet, the gas source can be rotated in a first direction, the disengaging can include rotating the gas source in second direction relative to the ratchet, and the second direction can be opposite to the first direction.

For yet another example, a spring can apply the force to the pawl.

For another example, the gas source can be a carbon dioxide canister containing carbon dioxide therein.

For yet another example, the ratchet can include a thread, and engaging the ratchet with the gas source can include threadably engaging the thread with the gas source.

BRIEF DESCRIPTION OF DRAWINGS

This disclosure will be more fully understood from the following detailed description taken in conjunction with the accompanying drawings, in which:

FIG. 4K is another cross-sectional perspective view of the gas source coupling assembly of FIG. 4E;

FIG. 8E is a cross-sectional side view of the gas source assembly and a portion of the gas source of FIG. 8C;

FIG. 9 is a flowchart of one embodiment of a method of coupling a gas source with a treatment system.

DETAILED DESCRIPTION

Figure 1:
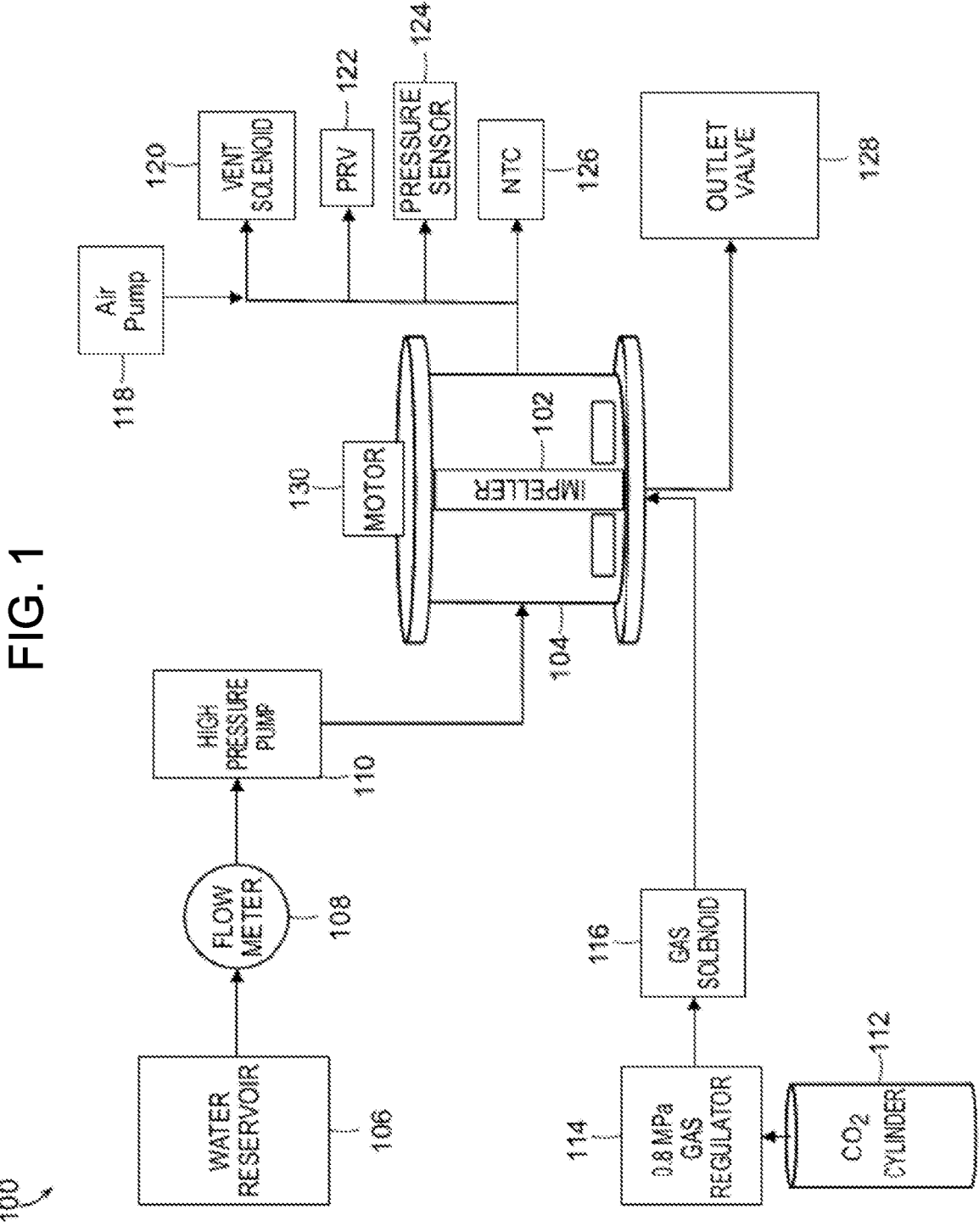
FIG. 1 is a schematic view of one embodiment of a carbonation system.

Certain embodiments will now be described to provide an overall understanding of the principles of the structure, function, manufacture, and use of the devices, systems, and methods disclosed herein. One or more examples of these embodiments are illustrated in the accompanying drawings. Those skilled in the art will understand that the devices, systems, and methods specifically described herein and illustrated in the accompanying drawings are non-limiting embodiments and that the scope of the present invention is defined solely by the claims. The features illustrated or described in connection with one exemplary embodiment may be combined with the features of other embodiments. Such modifications and variations are intended to be included within the scope of the present invention.

Further, in the present disclosure, like-named components of the embodiments generally have similar features, and thus within a particular embodiment each feature of each like-named component is not necessarily fully elaborated upon. Additionally, to the extent that linear or circular dimensions are used in the description of the disclosed systems, devices, and methods, such dimensions are not intended to limit the types of shapes that can be used in conjunction with such systems, devices, and methods. A person skilled in the art will recognize that an equivalent to such linear and circular dimensions can easily be determined for any geometric shape.

Various illustrative systems, devices, and methods for a ratchet system for a gas canister in a beverage system are provided. In general, a beverage system is configured to form a beverage and dispense the beverage into a container, such as a bottle, a cup, or other container. The beverage system can be a carbonation system configured to form a carbonated fluid and dispense the carbonated fluid into a container. In an exemplary embodiment, the beverage system includes a ratchet system configured to provide feedback to a user indicating that a gas source, such as a $CO_2$ canister for a carbonation system, has been properly coupled to the beverage system. The feedback is configured to be provided to the user automatically in response to the gas source being properly coupled to the beverage system. The user may thus easily learn that the gas source has been properly coupled to the beverage system and that the beverage system is therefore ready for use with the gas source.

In an exemplary embodiment, the ratchet system is configured to mechanically interact with a gas source to automatically provide the feedback in response to the gas source being properly coupled to the beverage system. The feedback can thus be provided mechanically such that no electric power and no electronic components (e.g., light, display, graphical user interface (GUI), etc.) need to be used for the user to receive the feedback. Mechanically providing the feedback may help control cost of the beverage system and/or the gas source, and/or may allow the gas source to be coupled to the beverage system regardless of whether or not the beverage system is powered on or is plugged in or otherwise coupled to a power source.

The systems, devices, and methods described herein are not limited to carbonation systems in which a liquid is mixed with $CO_2$ to form a treated fluid in the form of a carbonated fluid intended to be a beverage. A beverage carbonation system is one example of a treatment system to which the systems, devices, and methods described herein apply. Other treatment systems are generally configured and used similar to the carbonation systems described herein except instead of mixing $CO_2$ with a liquid, a different gas is mixed with the liquid. The resulting fluid is a treated fluid but is not a "carbonated" fluid.

FIG. 1 illustrates one embodiment of a carbonation system 100 configured to form a carbonated fluid. The carbonation system 100 of this illustrated embodiment includes an agitator (labelled "impeller" in FIG. 1) 102 and includes a mixing chamber 104 in which the agitator 102 is disposed and configured to rotate to form the carbonated fluid. Various embodiments of agitators and mixing chambers are described, for example, in U.S. Pat. No. 11,612,865 entitled "Agitator For A Carbonation System" issued Mar. 28, 2023, which is hereby incorporated by reference in its entirety.

The carbonation system 100 also includes a liquid source (also referred to herein as a "liquid reservoir") 106 configured to be a source of liquid for mixing in the mixing chamber 104, a flow meter 108 configured to regulate an amount of liquid that flows from the liquid source 106 to the mixing chamber 104, and a high pressure pump 110 configured to pump liquid from the liquid source 106 to the mixing chamber 104. The liquid is water in this illustrated embodiment such that the liquid source 106 is a water reservoir, but another liquid can be used, such as juice. The pump for liquid is a high pressure pump 110 in this illustrated example but can be another type of pump, such as a low pressure, high flow rate pump.

The carbonation system 100 also includes a gas source 112 configured to be a source of gas for mixing in the chamber 104, a gas regulator 114 configured to regulate an amount of gas that flows from the gas source 112 to the chamber 104, and a gas solenoid valve 116 configured to open and close to selectively allow the gas to flow from the gas source 112 to the chamber 104. The gas is $CO_2$ in this illustrated embodiment such that the gas source 112 is a $CO_2$ source in the form of a $CO_2$ cylinder (also referred to herein as a "$CO_2$ canister"), but another gas can be used (in which case, as mentioned above, the fluid dispensed would not be a "carbonated" fluid but would be a treated fluid), and the gas source 112 can have a shape other than cylindrical. The gas regulator 114 is an 0.8 MPa gas regulator in this illustrated embodiment but other gas regulators can be used. For example, the gas regulator 114 can be a 0.65 MPa gas regulator. The gas regulator 114 can be configured to allow a high flow rate of gas when it is open so that the operation of the process takes less time as compared to use of a low flow rate of gas.

The gas source 112 is configured to be removably coupled to the carbonation system 100. The gas source 112 is thus configured to be replaced by a user, either by being replaced with the same gas source refilled with gas or replaced with another gas source. A user may replace the gas source 112 at any time of the user's choosing. As discussed herein, the carbonation system 100 is configured to provide feedback to a user indicating that a gas source, e.g., the gas source 112 of FIG. 1 or other gas source, has been properly coupled to the carbonation system 100. The carbonation system 100 thus includes a ratchet system (not shown in FIG. 1) as described herein to facilitate the providing of the feedback.

The carbonation system 100 also includes an air pump 118 configured to drive a flow of the carbonated fluid out of the mixing chamber 104 through an outlet valve 128. The outlet valve 128 is configured to selectively open to allow the carbonated fluid to exit the chamber 104 and out of the carbonation system 100, e.g., for dispensing into a container such as a cup, a bottle, etc. The outlet valve 128 can be of a type that allows modulation of the flow passage through the outlet valve 128 such that the outlet valve 128 can be used as a control element configured to manage the flow rate. In particular, the opening of the outlet valve 128 can be configured to avoid creating a sudden jet or burst of flow at the start of dispensing. The air pump 118 is configured to pump air into the mixing chamber 104 such that, with the outlet valve 128 open, the carbonated fluid in the mixing chamber 104 is forced out of the mixing chamber 104 and out of the carbonation system 100 through the outlet valve 128.

In some embodiments, a pressure within the mixing chamber 104 in combination with resistance of an output channel can be configured to drive a flow of the carbonated fluid out of the mixing chamber 104 through the outlet valve 128 before the air pump 118 is actuated to pump air into the mixing chamber 104. Various embodiments of such flow control are described, for example, in U.S. patent application Ser. No. 17/821,212 entitled "Beverage Carbonation System Flow Control" filed Aug. 22, 2022, which is hereby incorporated by reference in its entirety. The various embodiments of carbonation systems (e.g., the carbonation system 100 of FIG. 1, a carbonation system 200 of FIG. 2, a carbonation system 300 of FIGS. 3A and 3B, a carbonation system 400 of FIGS. 4A-4C, etc.) described herein can include such flow control.

The carbonation system 100 also includes a vent solenoid valve 120 configured to allow excess pressure to be released from the mixing chamber 104 with the vent solenoid valve 120 open, a pressure relief valve (PRV) 122, a pressure sensor 124 configured to measure pressure in the mixing chamber 104, and a temperature sensor 126 configured to measure temperature in the mixing chamber 104. The temperature sensor 126 may be a negative temperature coefficient (NTC) thermistor as in this illustrated embodiment, but another type of temperature sensor can be used. In some embodiments, the temperature sensor 126 is omitted.

The carbonation system 100 also includes a motor 130 configured to drive the rotation of the agitator 102. The motor 130 is shown disposed outside of and above the mixing chamber 104 in this illustrated embodiment but a first portion of the motor 130 can be disposed inside the mixing chamber 104 and a second portion of the motor 130 can be disposed outside of the mixing chamber 104. Various embodiments of motors are described, for example, in previously mentioned U.S. Pat. No. 11,612,865 entitled "Agitator For A Carbonation System" issued Mar. 28, 2023.

Figure 2:
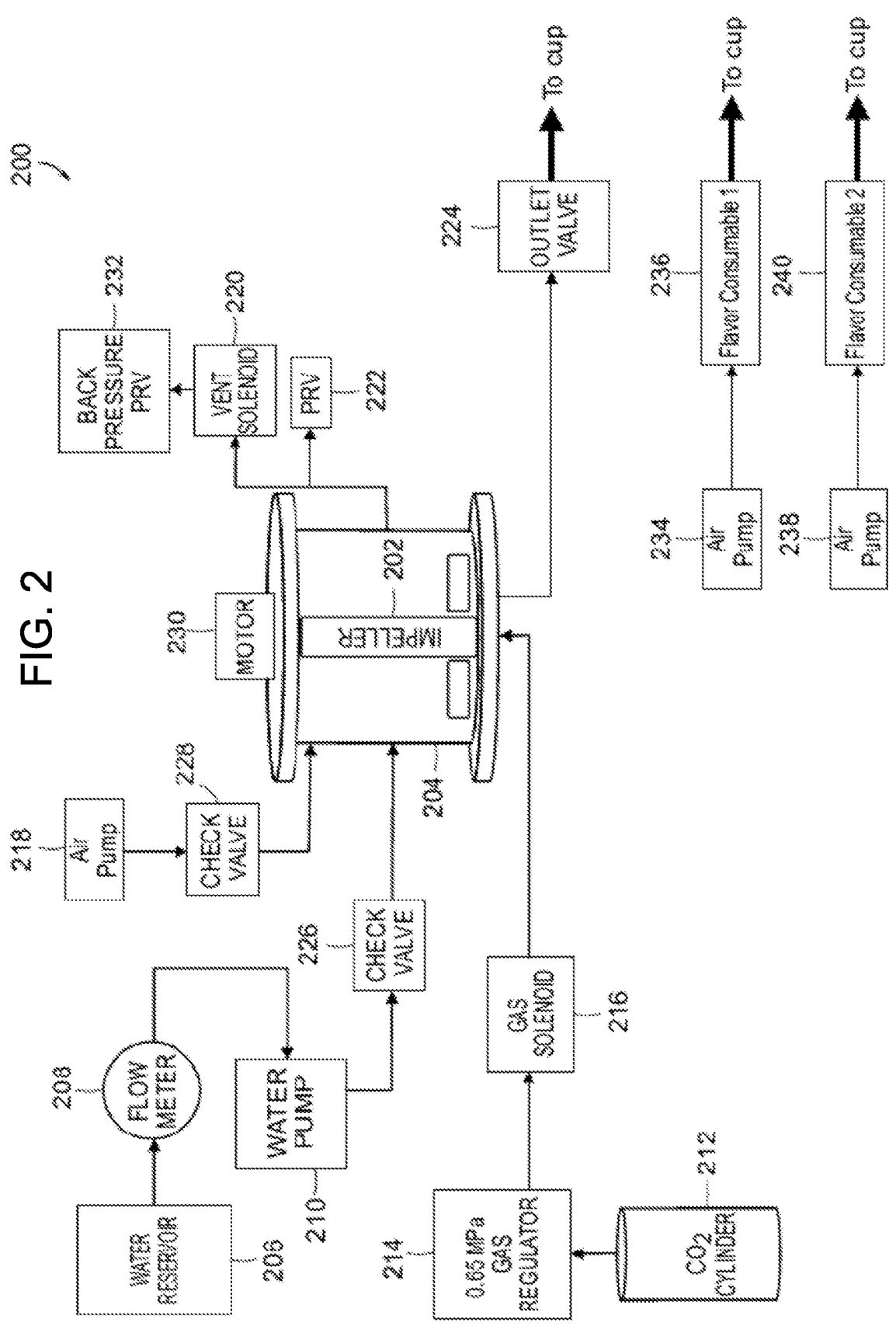
FIG. 2 is a schematic view of another embodiment of a carbonation system.

FIG. 2 illustrates another embodiment of a carbonation system 200 configured to form a carbonated fluid. The carbonation system 200 of this illustrated embodiment includes an agitator (labelled "impeller" in FIG. 2) 202 and includes a mixing chamber 204 in which the agitator 202 is disposed and configured to rotate to form a carbonated fluid. The carbonation system 200 of FIG. 2 is generally configured and used similar to the carbonation system 100 of FIG. 1, e.g., includes a liquid source 206, a flow meter 208, a pump 210, a gas source 212, a gas regulator 214 configured to regulate an amount of gas that flows from the gas source 212 to the mixing chamber 204, a gas solenoid valve 216, an outlet valve 224, a first air pump 218 configured to drive a flow of carbonated fluid out of the chamber through the outlet valve 224, a vent solenoid valve 220, a PRV 222, and a motor 230. The liquid is water in this illustrated embodiment such that the liquid source 206 is a water reservoir, but another liquid can be used, such as juice.

The gas is $CO_2$ in this illustrated embodiment such that the gas source 212 is a $CO_2$ source in the form of a $CO_2$ cylinder, but another gas can be used, and the gas source 212 can have a shape other than cylindrical. The gas regulator 214 is an 0.65 MPa gas regulator in this illustrated embodiment but other gas regulators can be used (e.g., as described above). The container into which the carbonated fluid is dispensed via the outlet valve 224 is a cup in this illustrated embodiment, but another type of container can be used.

The gas source 212 is configured to be removably coupled to the carbonation system 200. The gas source 212 is thus configured to be replaced by a user, either by being replaced with the same gas source refilled with gas or replaced with another gas source. A user may replace the gas source 212 at any time of the user's choosing. As discussed herein, the carbonation system 200 is configured to provide feedback to a user indicating that a gas source, e.g., the gas source 212 of FIG. 2 or other gas source, has been properly coupled to the carbonation system 200. The carbonation system 200 thus includes a ratchet system (not shown in FIG. 2) as described herein to facilitate the providing of the feedback.

The carbonation system 200 also includes a first check valve 226 disposed between the high pressure pump 210 and the mixing chamber 204. The first check valve 226 is configured to allow the liquid to flow only in a direction toward the mixing chamber 204.

The carbonation system 200 also includes a second check valve 228 disposed between the first air pump 218 and the mixing chamber 204. The second check valve 228 is configured to allow the air to flow only in a direction toward the mixing chamber 204.

The carbonation system 200 also includes a back pressure PRV 232 in series with the vent solenoid valve 220 that is configured to regulate headspace pressure in the mixing chamber 204 at a chosen value even if the vent solenoid valve 220 remains open. In this way, the timing of closing the vent solenoid valve 220 may not be critical to the correct operation of the system for dispensing. That is, the back pressure PRV 232 is configured to restrict a rate of gas escape from the mixing chamber 204 and thereby avoid a very high rate of depressurization that can cause agitation as residual bubbles expand in fluid in the mixing chamber 204. The back pressure PRV 232 is also configured to limit the mixing chamber 204 pressure even if the air pump 218 is unregulated, which may allow for a lower cost air pump 218 or the use of a separate pump control loop via a pressure sensor. In this way, the back pressure PRV 232 may allow a lower system cost to be achieved with the system being configured to effectively control dispensing.

The carbonation system 200 also includes a second air pump 234, a first consumable 236, a third air pump 238, a second consumable 240. Each of the first and second consumables 236, 240 can include one or more additives including any of a variety of ingredients, including, for example, flavorants, colorants, vitamins, minerals, chemicals, other ingredients, or any suitable combination of the foregoing. The second air pump 234 is configured to cause a first additive(s) contained in the first consumable 236, e.g., a cup, a pouch, etc., to be dispensed into the cup (or other container). The third air pump 238 is configured to cause a second additive(s) contained in the second consumable 240, e.g., a cup, a pouch, etc., to be dispensed into the cup (or other container). The carbonation system 200 can be configured to allow a user to select which one or both of the first and second additives is dispensed into the cup (or other container) and/or to allow the user to select an amount of the selected additive(s) to be dispensed into the cup (or other container). The user may select no additive. The selected additive(s) can be dispensed into the cup (or other container) before the carbonated fluid is dispensed, after the carbonated fluid is dispensed, or simultaneously with the dispensing of the carbonated fluid. Various embodiments of beverage systems configured to add additive(s) are described, for example, in U.S. Pat. No. 11,751,585 entitled "Flavored Beverage Carbonation System" issued Sep. 12, 2023, U.S. Pat. No. 11,745,996 entitled "Ingredient Containers For Use With Beverage Dispensers" issued Sep. 5, 2023, and U.S. patent application Ser. No. 18/099,690 entitled "Venting A Chamber In A Beverage Carbonation System" filed Jan. 20, 2023, which are hereby incorporated by reference in their entireties.

Figure 3A:
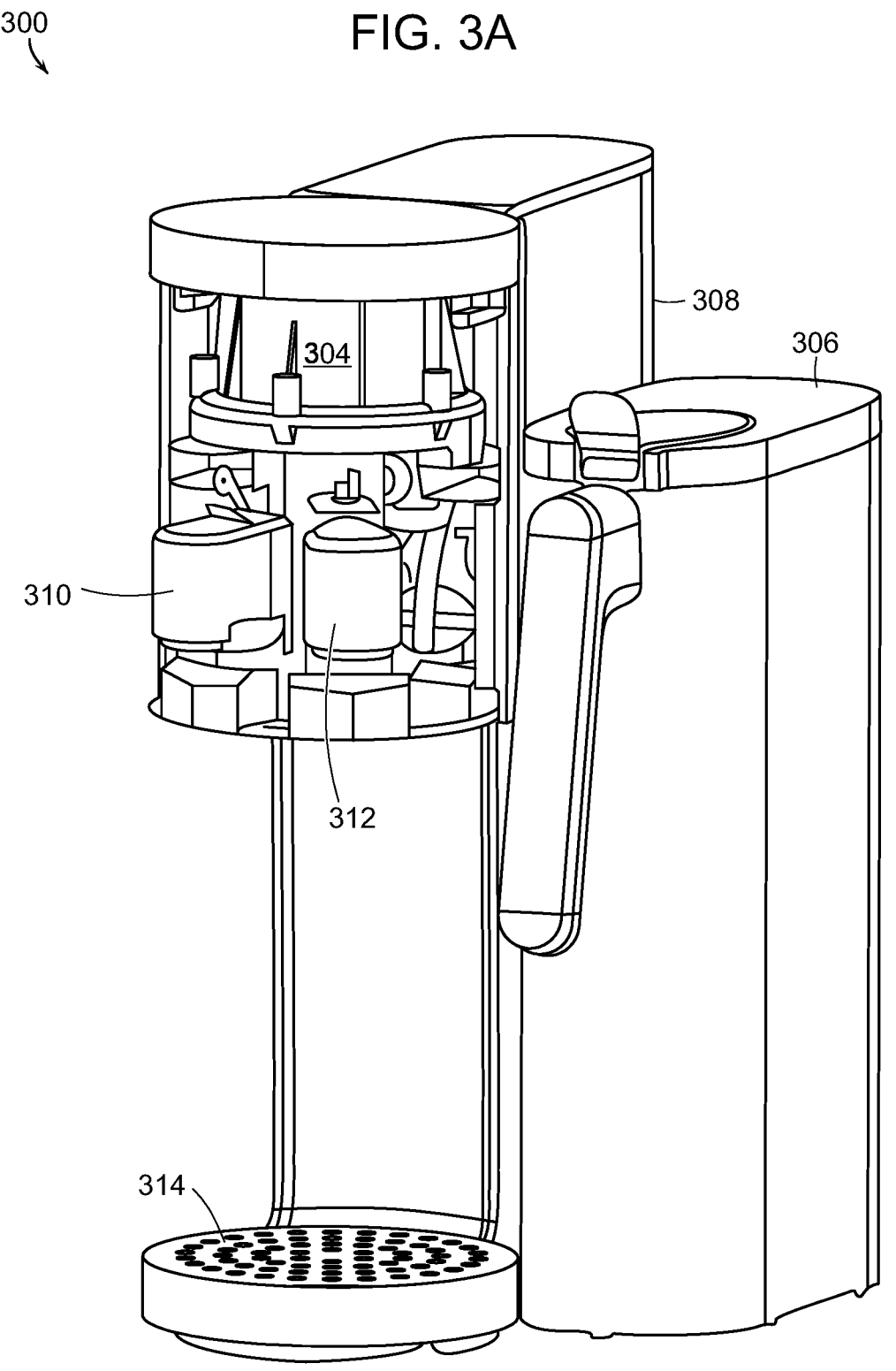
FIG. 3A is a partial perspective view of another embodiment of a carbonation system.
Figure 4A:
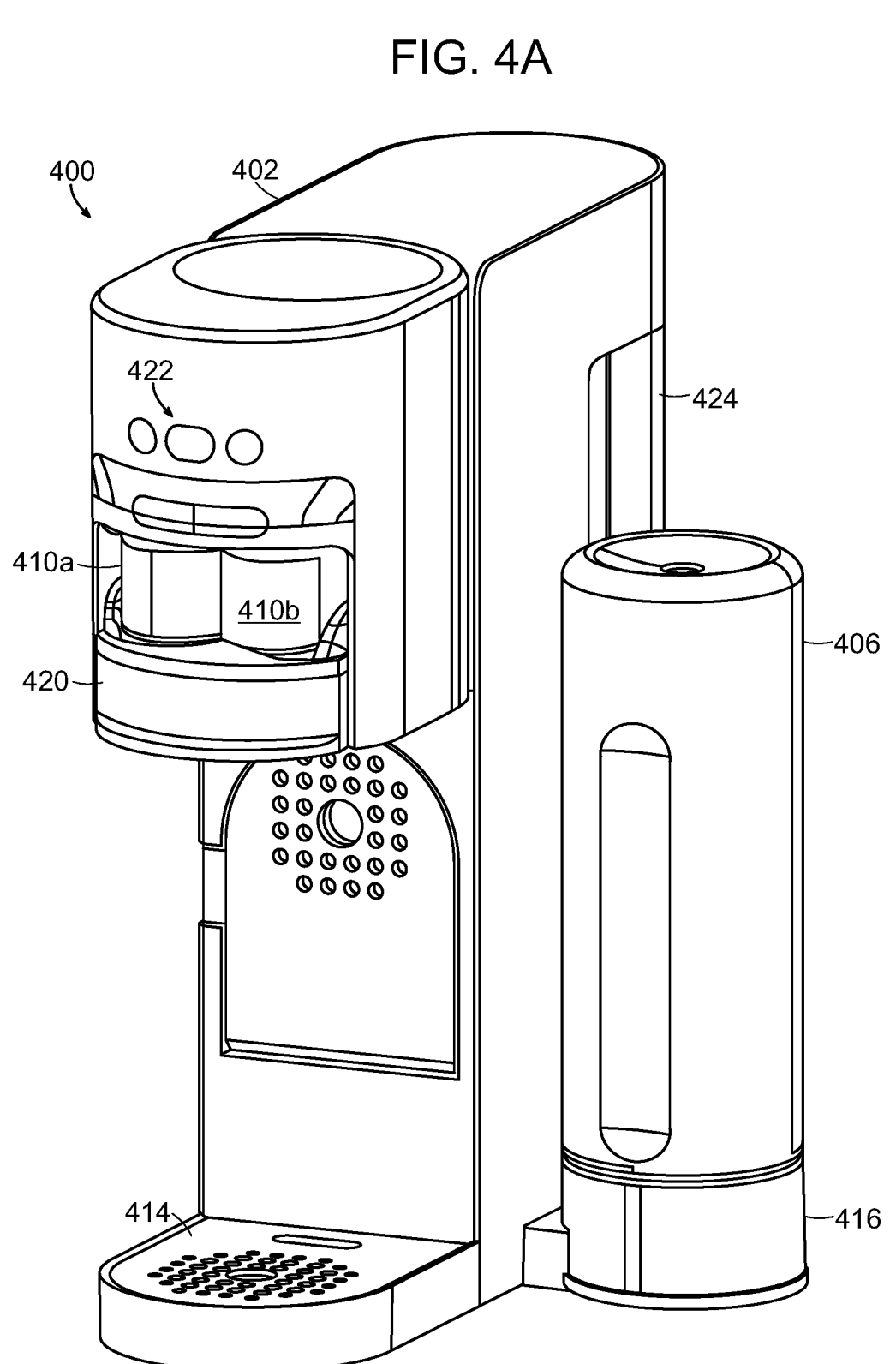
FIG. 4A is a perspective view of another embodiment of a carbonation system.

The carbonation system 200 in the illustrated embodiment of FIG. 2 is configured to add one or more additives, but in other embodiments the carbonation system 200 can be configured to not add any additives. FIGS. 3A and 4A illustrate other examples of a carbonation system 300, 400 configured to add an additive. FIG. 1 illustrates an example of a carbonation system 100 that does not add any additives, although such systems could be configured to add an additive.

The carbonation systems 100, 200 of FIGS. 1 and 2 each include an air pump 118, 218 configured to introduce air into their respective mixing chambers 104, 204 to drive a flow of the carbonated fluid to dispense carbonated fluid through the outlet valve 128, 224. In some embodiments, the air in a mixing chamber may be vented during the filling of the liquid, for example, using the vent solenoid valve 120, 220.

In other embodiments, rather than using air (including its constituent gasses), a carbonation system can be configured to introduce a gas other than air from a gas source into a mixing chamber to dispense carbonated fluid through an outlet valve. In such embodiments, a pressure within the mixing chamber is configured to drive a flow of the treated fluid out of the mixing chamber through the outlet valve before the gas source, e.g., the gas source 112 of FIG. 1, the gas source 212 of FIG. 2, etc., is actuated to introduce gas into the mixing chamber with a gas regulator, e.g., the gas regulator 114 of FIG. 1, the gas regulator 214 of FIG. 2, etc., that controls an injection rate of the gas into the mixing chamber. In an illustrative embodiment, the gas source from which gas is introduced into the mixing chamber for purposes of dispensing the carbonated fluid is the same gas source that supplies gas to the mixing chamber for treating (e.g., mixing with) a liquid in the mixing chamber, for example a $CO_2$ canister. Agitation may last for a shorter amount of time when using the treatment gas for dispensing instead of air since any treatment gas remaining in the mixing chamber from a last carbonation-dispense cycle can start to dissolve in the chamber as soon as liquid starts to be introduced into the mixing chamber, instead of waiting until filling with water is complete and/or agitation has started. For example, sufficient agitation may last 12 seconds when air is used for dispensing but last only 10 seconds when a gas from another gas source is used for dispensing. Also, the effective concentration of gas in the mixing chamber's headspace may be increased in the absence of dilution by residual air introduced into the mixing chamber during an earlier cycle to aid in dispensing.

The valve used in introducing the gas into the mixing chamber for purposes of mixing can be the same valve used in introducing the gas into the mixing chamber for purposes of dispensing, or different valves may be used. If the same valve is used, the valve can be a proportional valve that has a range of flow settings or a digital valve that opens in pulses to accommodate different gas introductions for mixing and for dispensing. Using different valves can allow for a valve to be used in introducing the gas into the mixing chamber for purposes of dispensing that is adapted for use with much lower target pressures than used in introducing gas for purposes of mixing since less gas is typically introduced for dispensing than for mixing, in which a larger amount of gas is typically introduced into the mixing chamber very quickly.

Figure 3B:
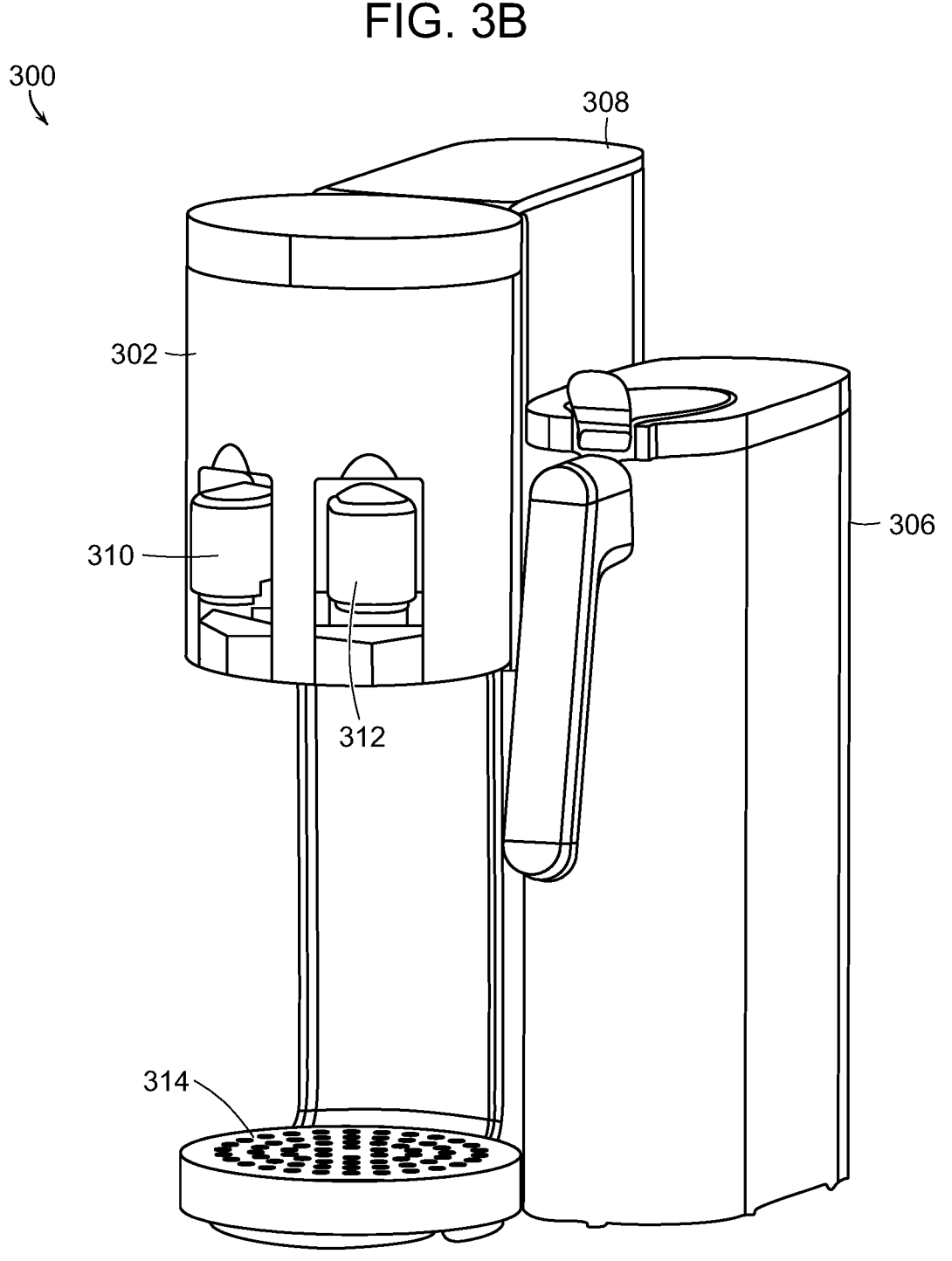
FIG. 3B is another perspective view of the carbonation system of FIG. 3A.

FIGS. 3A and 3B illustrate another embodiment of a carbonation system 300 configured to form a carbonated fluid. A cover 302 of the carbonation system 300 is omitted in FIG. 3A to show a mixing chamber 304 of the carbonation system 300. Various embodiments of mixing chambers are described, for example, in previously mentioned U.S. Pat. No. 11,612,865 entitled "Agitator For A Carbonation System" issued Mar. 28, 2023. The carbonation system 300 can have a variety of configurations, such as a configuration similar to the carbonation system 100 of FIG. 1, the carbonation system 200 of FIG. 2, a carbonation system 400 of FIGS. 4A-4C, or other carbonation system described herein.

The carbonation system 300 includes a liquid reservoir 306 in the form of a pitcher configured to be releasably coupled to a housing 308 of the carbonation system 300 in which the mixing chamber 304 is located. Other liquid reservoirs can be used, and the pitcher 306 can have any of a variety of configurations. A check valve, such as the first check valve 226 of FIG. 2, can be configured to automatically open in response to the pitcher 306 being seated in a base or dock (not shown) of the carbonation system 300 to allow liquid, e.g., water, in the pitcher 306 to flow out of the pitcher 306 and into the mixing chamber 304. In some embodiments, the liquid reservoir can be integral to the carbonation system 300, such as by being a built-in refillable tank or other refillable reservoir, instead of being configured to releasably couple to the carbonation system 300. Various embodiments of carbonation systems configured to be in selective fluid communication with a liquid source are described, for example, in previously mentioned U.S. patent application Ser. No. 17/744,459 entitled "Flavored Beverage Carbonation System" filed May 13, 2022 and U.S. patent application Ser. No. 17/989,640 entitled "Ingredient Containers For Use With Beverage Dispensers" filed Nov. 17, 2022.

The mixing chamber 304 is configured to receive liquid therein through a liquid inlet (obscured in the figures) operably coupled to the liquid source 306 (e.g., through liquid tubing and/or other components) and is configured to receive gas therein through a gas inlet (obscured in the figures) operably coupled to a gas source (obscured in the figures) of the carbonation system 300 (e.g., through gas tubing and/or other components). Excess gas not dispensed from the chamber 304 through an outlet valve is configured to exit the mixing chamber 304 through an outlet (obscured in the figures) operably coupled to a vent solenoid (obscured in the figures), such as the vent solenoid 120 of FIG. 1, the vent solenoid 220 of FIG. 2, etc.

The gas source is configured to be removably coupled to the carbonation system 300. The gas source is thus configured to be replaced by a user, either by being replaced with the same gas source refilled with gas or replaced with another gas source. A user may replace the gas source at any time of the user's choosing. As discussed herein, the carbonation system 300 is configured to provide feedback to a user indicating that a gas source, e.g., a gas source 412 of FIG. 4D or other gas source, has been properly coupled to the carbonation system 300. The carbonation system 300 thus includes a ratchet system (obscured in FIGS. 3A and 3B) as described herein to facilitate the providing of the feedback.

The carbonation system 300 in this illustrated embodiment is configured to selectively dispense first and second additives from first and second consumables 310, 312, respectively, into a container placed on a container base 314 of the carbonation system 300 that can also serve as a drip tray. However, as discussed above, the carbonation system 300 can be configured to add no additive or to add a different number of additives.

The carbonation system 300 also includes a processor (obscured in FIGS. 3A and 3B), such as a microcontroller that includes a processor and a memory, or other type of processor, disposed in the housing 308. In general, the processor is configured to execute instructions stored in a memory (obscured in FIGS. 3A and 3B) disposed in the housing 308 to cause various actions to occur, such as opening of an outlet valve of the carbonation system 300, causing the first additive(s) to be dispensed from the first additives) consumable 310, causing the second additive(s) to be dispensed from the second consumable 312, causing an alert (e.g., an illuminated (solid or blinking) light, an emitted sound, etc.) to be provided to a user when the carbonated fluid has finished being dispensed from the carbonation system 300, etc. Other embodiments of treatment systems (e.g., the carbonation system 100 of FIG. 1, the carbonation system 200 of FIG. 2, a carbonation system 400 of FIGS. 4A-4C, etc.) described herein can similarly include a processor.

Figure 4B:
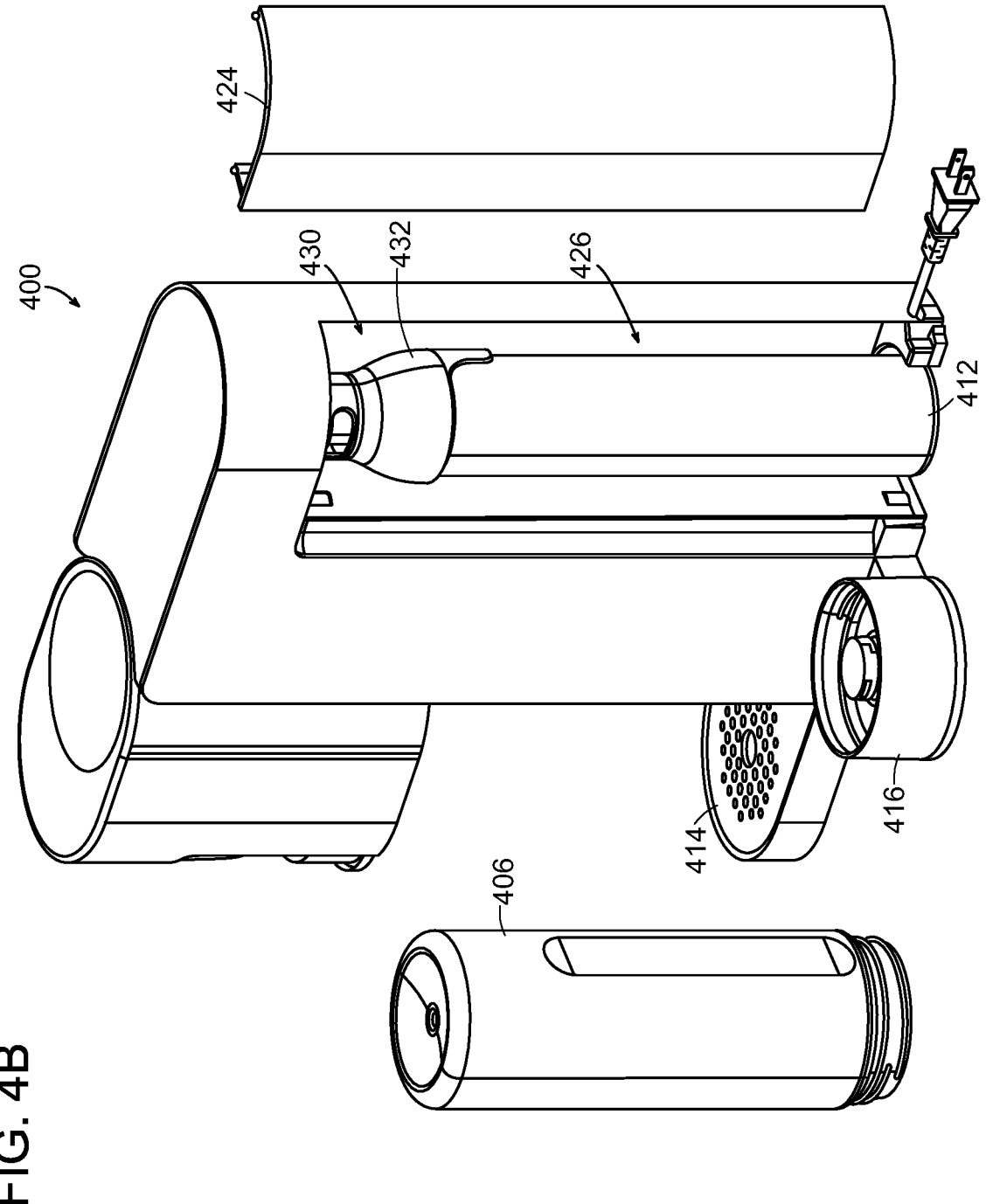
FIG. 4B is a perspective view of the carbonation system of FIG. 4A with a gas source chamber cover removed therefrom and with a liquid source released therefrom.
Figure 4C:
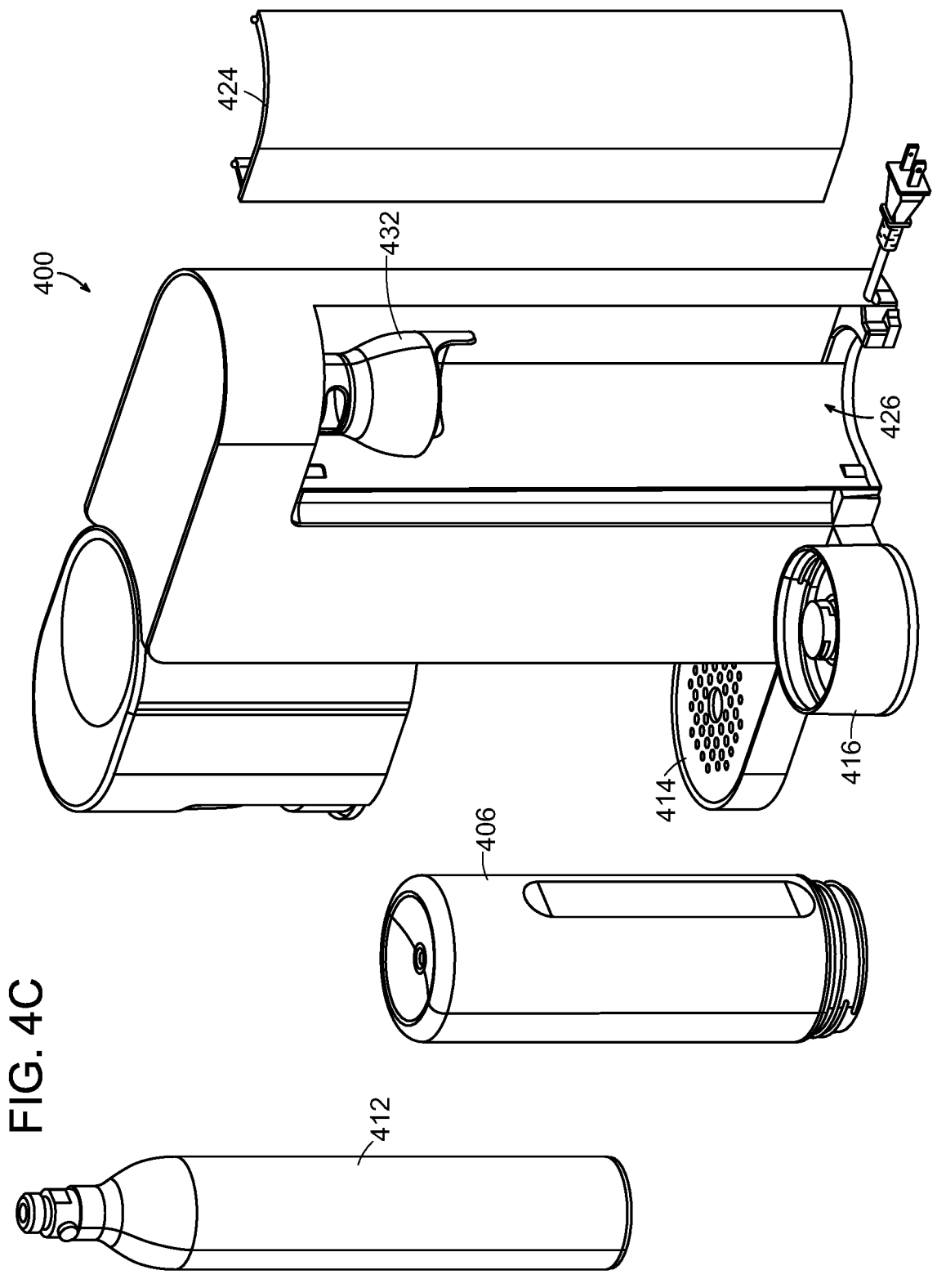
FIG. 4C is a perspective view of the carbonation system of FIG. 4B with a gas source removed from the gas source chamber.

FIGS. 4A-4C illustrate another embodiment of a carbonation system 400 configured to form a carbonated fluid. The carbonation system 400 can have a variety of configurations, such as a configuration similar to the carbonation system 100 of FIG. 1, the carbonation system 200 of FIG. 2, the carbonation system 300 of FIGS. 3A and 3B, or other carbonation system described herein.

The carbonation system 400 includes a liquid source 406 in the form of a bottle configured to be releasably coupled to the carbonation system 400 that includes a mixing chamber (obscured in FIGS. 4A-4C) in which the liquid can be mixed with a gas. Other liquid sources can be used, and the bottle 406 can have any of a variety of configurations. A check valve, such as the first check valve 226 of FIG. 2, can be configured to automatically open in response to the liquid source 406 being seated in a base 416 of the carbonation system 400 to allow liquid, e.g., water, juice, etc., in the liquid source 406 to flow out of the liquid source 406 and into the mixing chamber. FIG. 4A shows the liquid source 406 removably coupled to the carbonation system 400 via the base 416. FIGS. 4B and 4C show the liquid source 406 as a standalone element not coupled to the carbonation system 400. In some embodiments, the liquid reservoir can be integral to the carbonation system 400, such as by being a built-in refillable tank or other refillable reservoir, instead of being configured to releasably couple to the carbonation system 400. Various embodiments of carbonation systems configured to be in selective fluid communication with a liquid source are described, for example, in previously mentioned U.S. patent application Ser. No. 17/744,459 entitled "Flavored Beverage Carbonation System" filed May 13, 2022 and U.S. patent application Ser. No. 17/989,640 entitled "Ingredient Containers For Use With Beverage Dispensers" filed Nov. 17, 2022 and in U.S. patent application Ser. No. 18/364,776 entitled "Detecting Liquid Temperature For A Beverage Carbonation System" filed Aug. 3, 2023, which is hereby incorporated by reference in its entirety.

The carbonation system 400 in this illustrated embodiment is configured to selectively dispense first and second additives from first and second consumables 410a, 410b, respectively, into a container (not shown) placed on a container base 414 of the carbonation system 400 that can also serve as a drip tray. The carbonation system 400 includes a carriage assembly 420 configured to receive the first and second consumables 410a, 410b. However, as discussed above, the carbonation system 400 can be configured to add no additive or to add a different number of additives.

The carbonation system 400 includes a user interface 422 configured to receive input from a user regarding one or more aspects of the carbonation system 400 (e.g., volume of carbonated fluid to be dispensed, carbonation level, specific additives, additive amount, etc.) and/or configured to provide alerts (e.g., audible and/or visual) to the user regarding one or more aspects of the carbonation system 400 (e.g., status of whether the carbonated fluid has finished being dispensed from the carbonation system 400, power on/off status of the carbonation system 400, etc.).

The carbonation system 400 includes a gas source 412 configured to be removably coupled to the carbonation system 400. The gas source 412 in this illustrated embodiment is in the form of a $CO_2$ canister that is cylindrically shaped, but as mentioned above, other gas sources are possible. The mixing chamber of the carbonation system 400 is configured to receive liquid therein through a liquid inlet (obscured in FIGS. 4A-4C) operably coupled to the liquid source 406 (e.g., through liquid tubing and/or other components) and is configured to receive gas therein through a gas inlet (obscured in FIGS. 4A-4C) operably coupled to the gas source 412 (e.g., through gas tubing and/or other components) that is removably coupled to the carbonation system 400. Excess gas not dispensed from the mixing chamber through an outlet valve is configured to exit the mixing chamber through an outlet (obscured in FIGS. 4A-4C) operably coupled to a vent solenoid (obscured in FIGS. 4A-4C), such as the vent solenoid 120 of FIG. 1, the vent solenoid 220 of FIG. 2, etc.

Figure 4D:
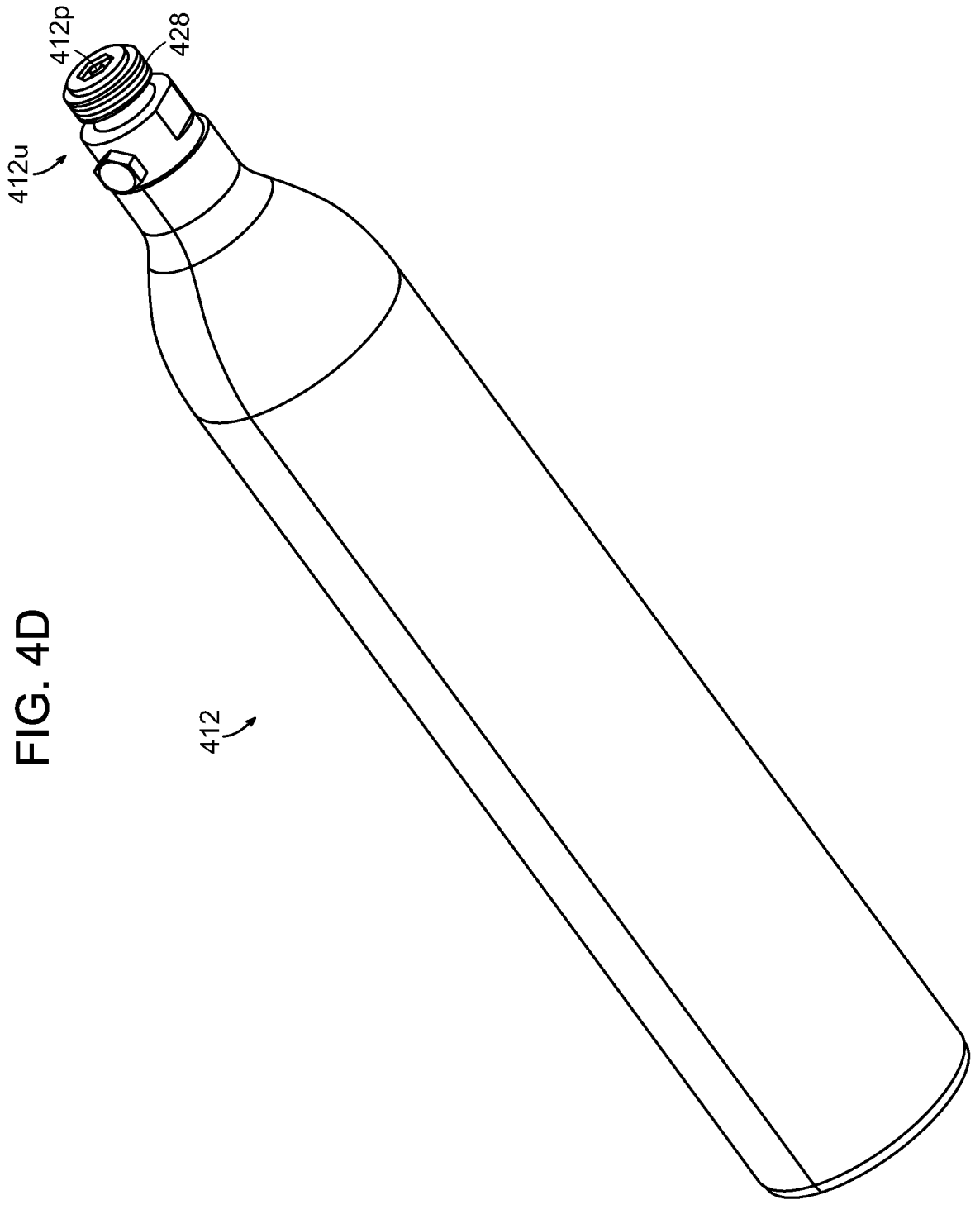
FIG. 4D is a perspective view of the gas source of FIG. 4C.

A gas source chamber cover 424 that forms part of and is releasably coupled to a housing 408 of the carbonation system 400 is released from the housing 402 in FIGS. 4B and 4C to show a gas source chamber 426 of the carbonation system 400 that is configured to removably receive the gas source 412 therein. The gas source chamber cover 424 in this illustrated embodiment is shown as being completely releasable from the housing 402, but in other embodiments can be partially releasable so as to open and provide access to the gas source chamber 426, e.g., by being a hinged door, by being slidable into a portion of the housing 402, etc. FIG. 4B shows the gas source 412 located in the gas source chamber 426 and removably coupled to the carbonation system 400. FIGS. 4C and 4D show the gas source 412 as a standalone element located outside of the gas source chamber 426 and not coupled to the carbonation system 400.

Figure 4E:
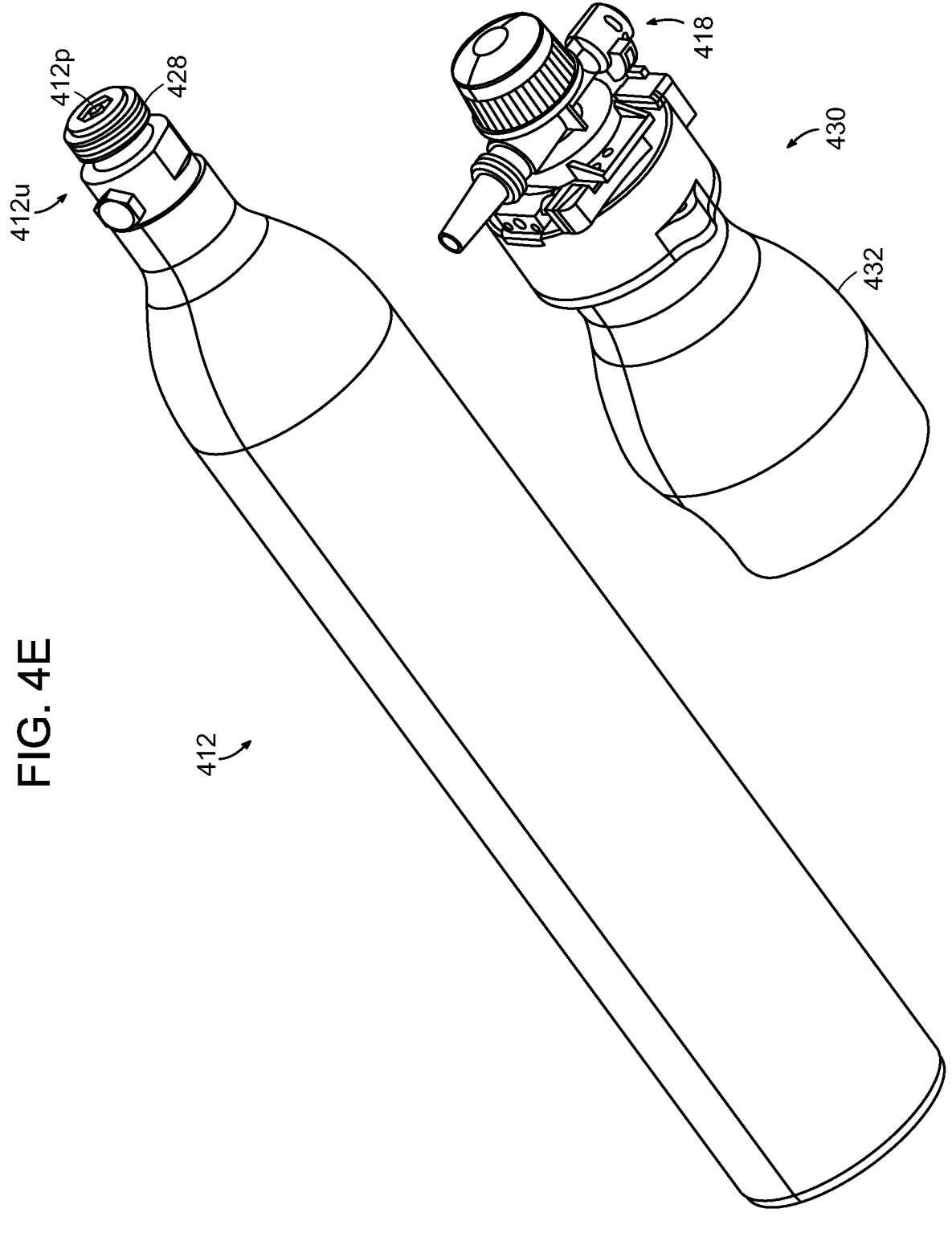
FIG. 4E is a perspective view of the gas source of FIG. 4D and a gas source coupling assembly of the carbonation system of FIG. 4B.

As shown in FIGS. 4D and 4E, the gas source 412 includes a pin 412p, e.g., a valve pin, at an upper end of the gas source 412. The pin 412p is configured to move between an extended position, in which the gas source 412 is closed such that gas contained in the gas source 412 cannot be released from the gas source 412, and a compressed position, in which the pin 412p has moved to open a valve such that the gas source 412 is open such that gas can be released therefrom. With the gas source 412 open, gas is configured to be released therefrom to a gas regulator (obscured in FIGS. 4A-4C) of the carbonation system 400. The pin 412p is in the extended position when the gas source 412 is not properly coupled to the carbonation system 400, and the pin

412p is in the compressed position when the gas source 412 is properly coupled to the carbonation system 400. FIGS. 4D and 4E show the pin 412p in the extended position.

Figure 4F:
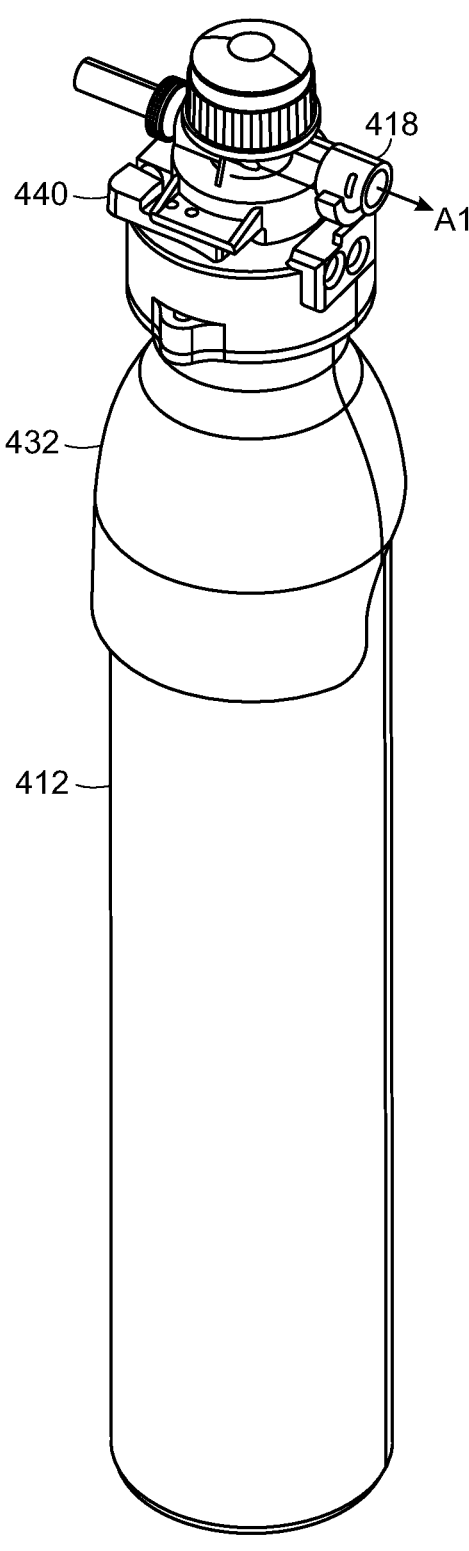
FIG. 4F is a perspective view of the gas source of FIG. 4D coupled to the gas source coupling assembly of FIG. 4E.
Figure 4G:
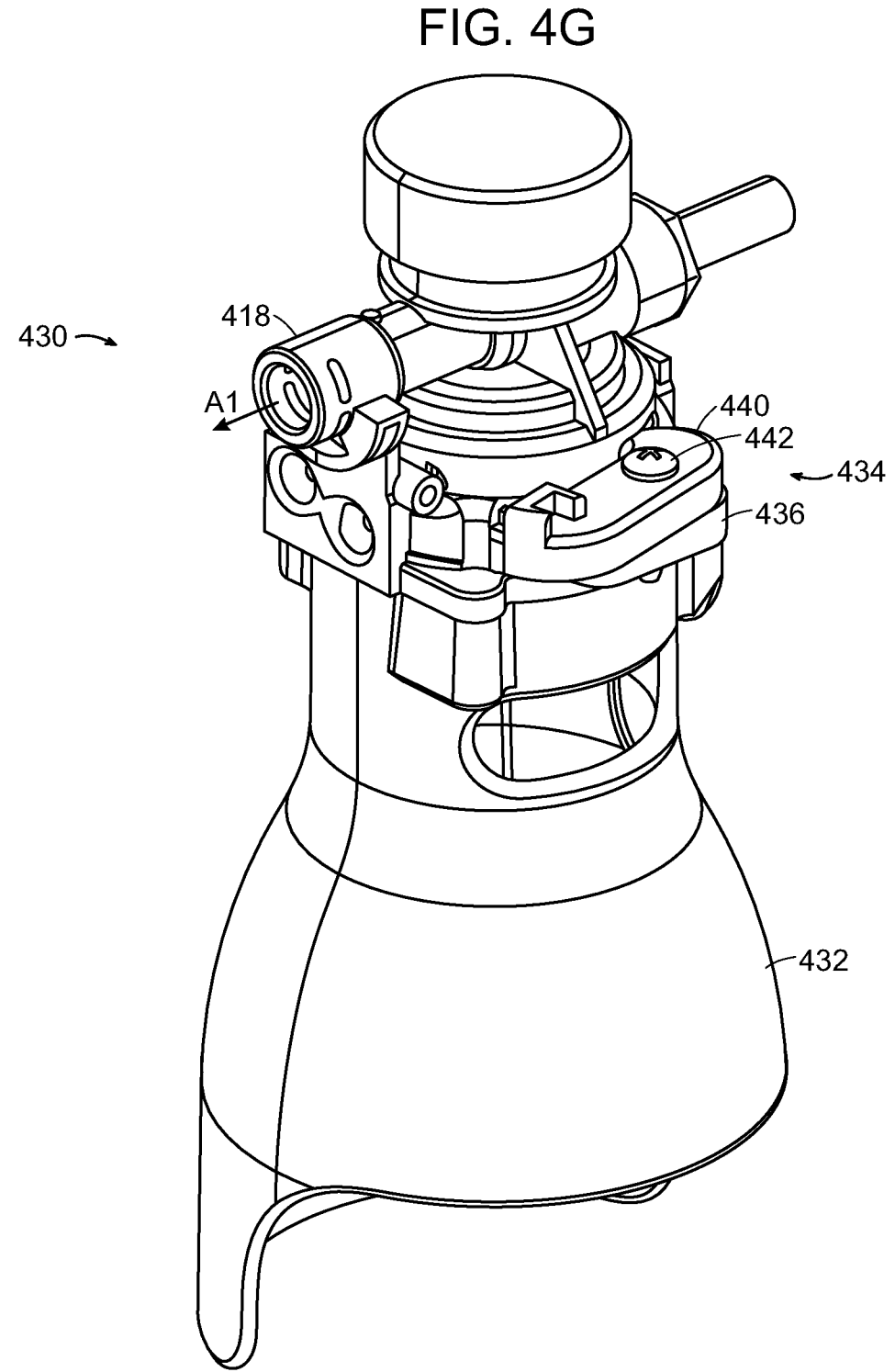
FIG. 4G is a perspective view of the gas source coupling assembly of FIG. 4E.
Figure 4H:
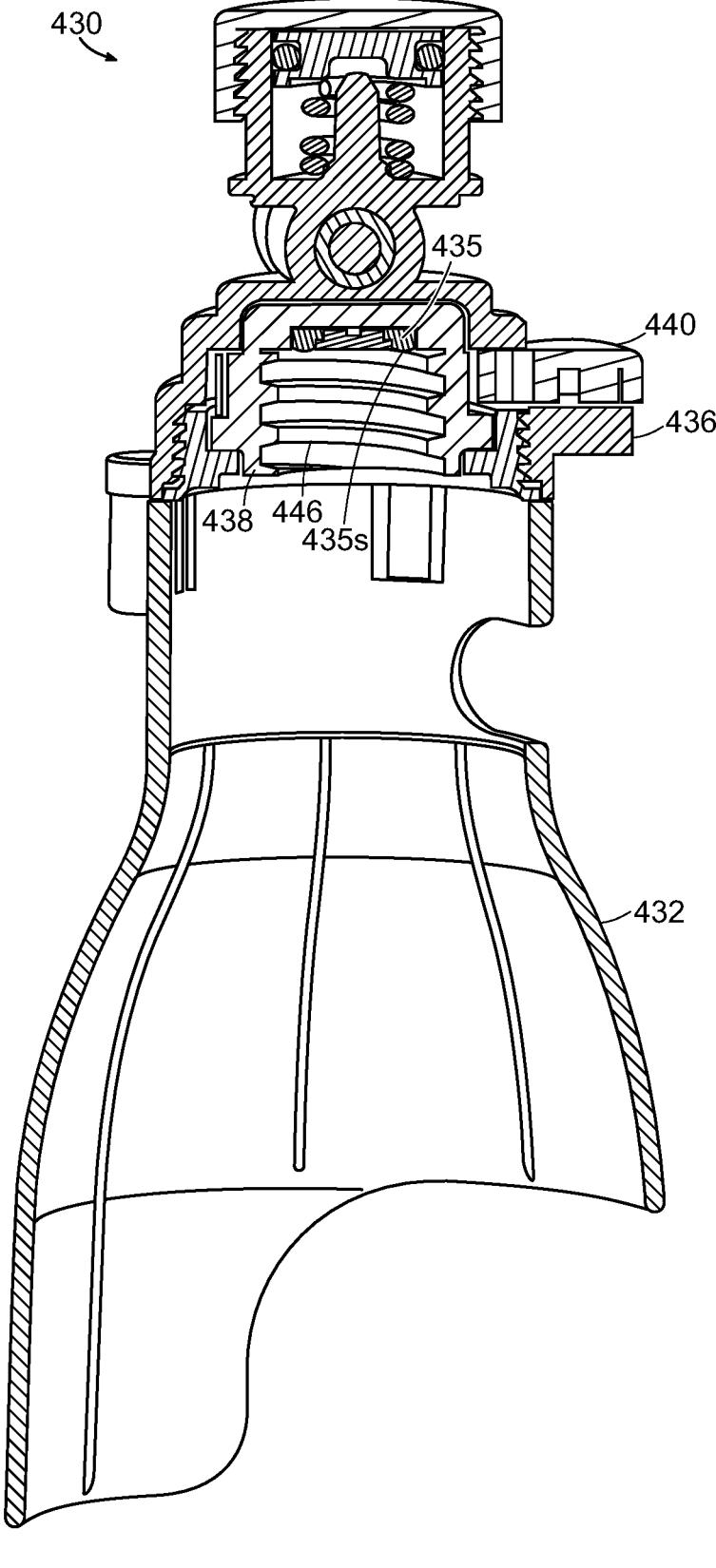
FIG. 4H is a cross-sectional side view of the gas source coupling assembly of FIG. 4E.

As discussed herein, the gas regulator is configured regulate an amount of gas that flows from the gas source 412 to the carbonation system's mixing chamber. From the gas regulator, the gas is configured to flow out of an outlet 418 toward the mixing chamber. FIGS. 4F and 4G illustrate with an arrow A1 flow of the gas through the outlet 418 toward the mixing chamber.

As discussed herein, the carbonation system 400 is configured to provide feedback to a user indicating that a gas source, e.g., the gas source 412 of FIG. 4D or other gas source, has been properly coupled to the carbonation system 400. The carbonation system 400 thus includes a ratchet system, as discussed further below, to facilitate the providing of the feedback.

The gas source 412 includes an upper engagement portion 412u configured to engage the carbonation system 400. The upper engagement portion 412u includes a thread 428 configured to threadably engage the ratchet system of the carbonation system 400, as discussed further below. The thread 428 extends helically and is on an external surface of the gas source 412 and extends circumferentially around the pin 412p, as shown in FIGS. 4D and 4E.

The gas source 412 is configured to removably couple to a gas source coupling assembly 430 of the carbonation system 400. The gas source coupling assembly 430 is shown as a standalone element in FIGS. 4E-4H. FIGS. 4B and 4F show the gas source 412 removably coupled to the gas source coupling assembly 430.

The gas source coupling assembly 430 includes the gas regulator, a collar 432, and a ratchet system 434. The collar 432, shown in FIGS. 4B, 4C, and 4E-4H, is configured to seat around an upper portion of the gas source 412 when the gas source 412 is coupled to the carbonation system 400. The collar 432 is also configured to serve as a guide to a user by indicating where and in what orientation the gas source 412 of FIG. 4D (or other gas source) should be coupled to the carbonation system 400. The collar 432 has an internal shape and size corresponding to an outer shape and size of the upper portion of the gas source 412 (or upper portion of another gas source configured to be removably coupled to the carbonation system 400), thereby clearly visually indicating to a user where and in what orientation the gas source 412 of FIG. 4D (or other gas source) should be coupled to the carbonation system 400. The proper coupling orientation of the gas source 412 of FIG. 4D (or other gas source) indicated by the collar 432 automatically helps ensure that the upper engagement portion 412u of the gas source 412 is aligned with the ratchet system 434 to allow the gas source to properly threadably engage the ratchet system 434, as discussed further below.

The ratchet system 434 is configured to mechanically interact with the gas source 412 of FIG. 4D (or other gas source) to automatically provide audible feedback to a user in response to the gas source 412 of FIG. 4D (or other gas source) being properly coupled to the carbonation system 400. The ratchet system 434 is positioned above the collar 432 and includes a base 436, a ratchet 438, a pawl (also referred to herein as a "ratchet arm") 440, and a spring (not shown). The spring can be a compression spring, a torsion spring, or other type of biasing element.

Figure 4I:
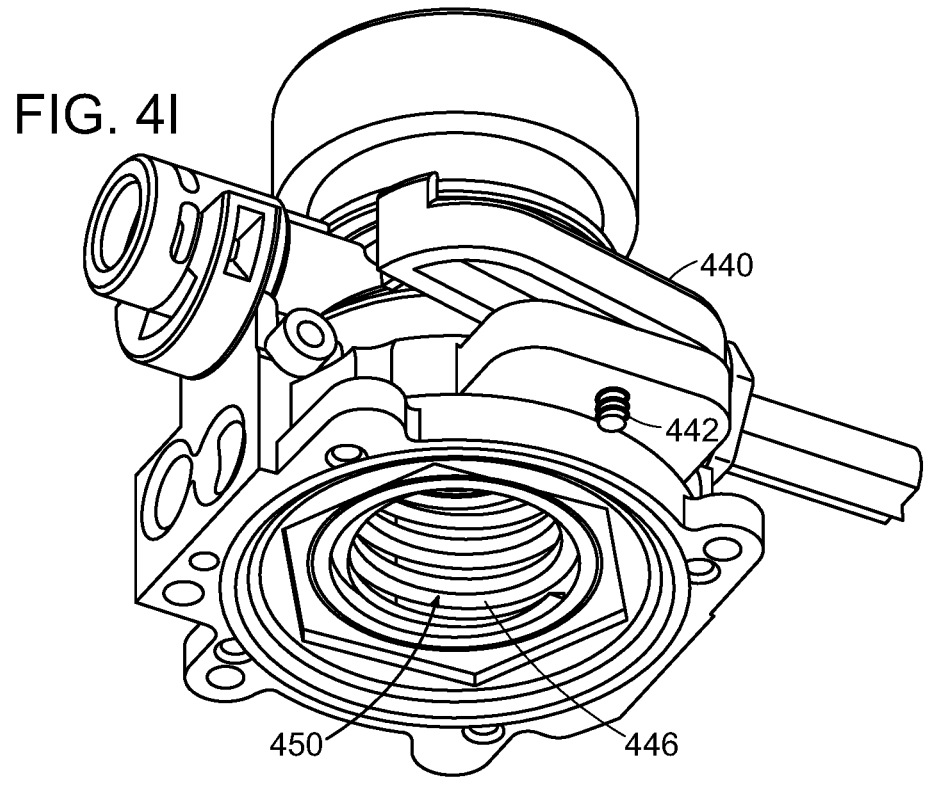
FIG. 4I is a perspective view of a portion of the gas source coupling assembly of FIG. 4E.
Figure 4J:
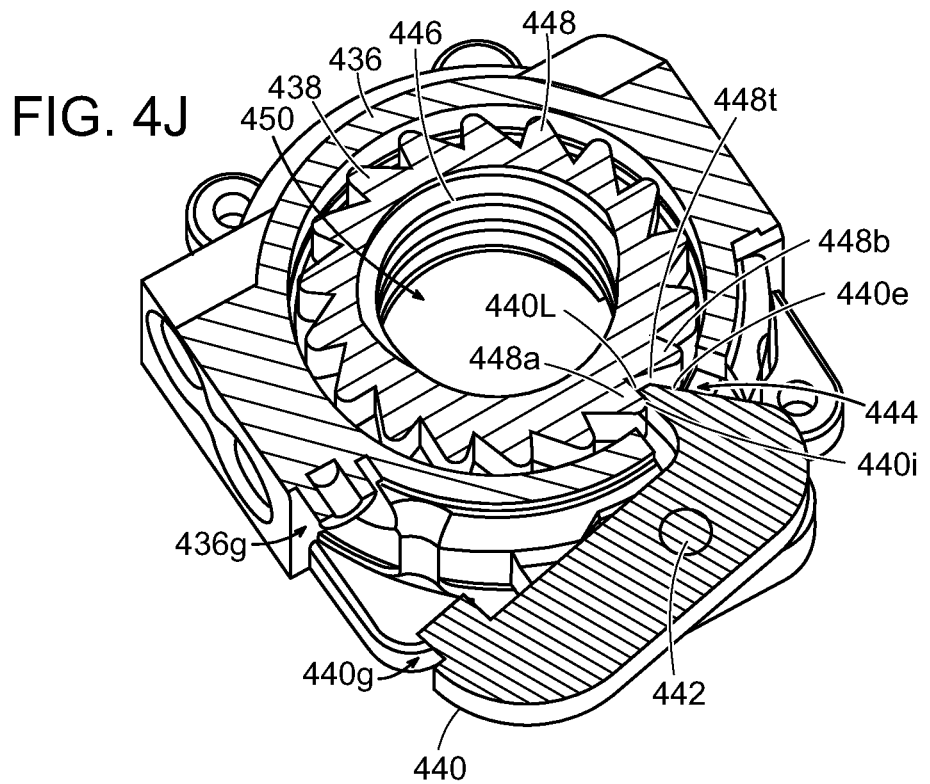
FIG. 4J is a cross-sectional perspective view of the gas source coupling assembly of FIG. 4E.
Figure 4K:
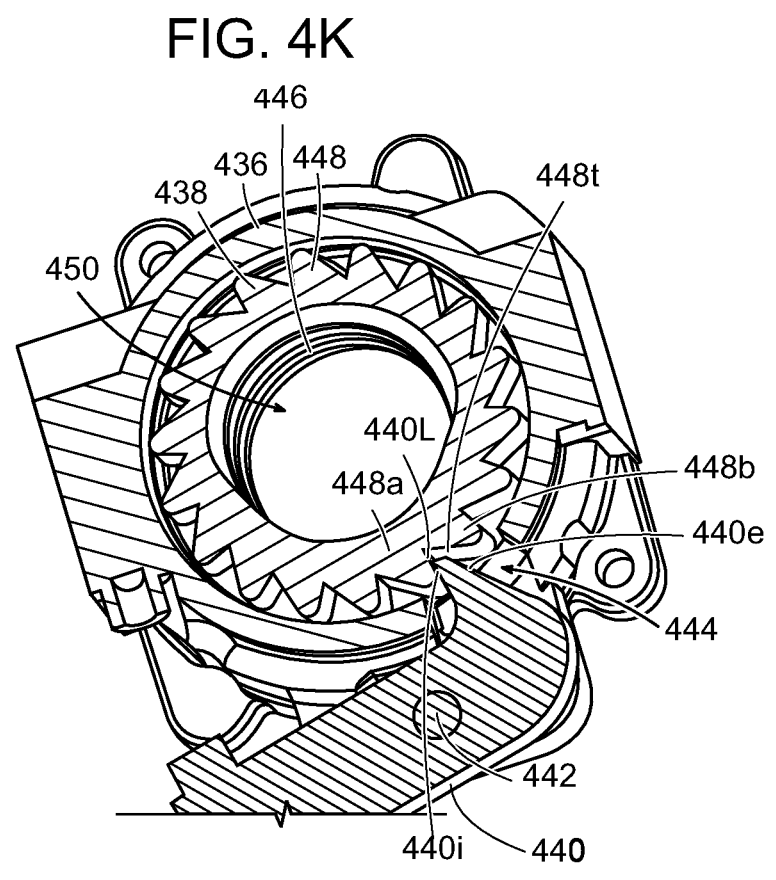

The collar 432 extends downward from the base 436. The ratchet 438 is movably seated in the base 436, as shown in FIGS. 4J and 4K. The pawl 440 is pivotally attached to the base 436 at a pivot point with a screw 442 in this illustrated embodiment, as shown in FIGS. 4G and 4I-4K, but the pawl 440 can be pivotally attached to the base 436 in other ways, as will be appreciated by a person skilled in the art, such as by using a non-threaded pin, etc. An engaging end of the pawl 440 extends through an opening 444 in the base 436 to engage the ratchet 438.

The ratchet 438 includes a thread 446 and a plurality of teeth 448. The thread 446 of the ratchet 438 is configured to threadably engage the thread 428 of the gas source 412 of FIG. 4D (or thread of another gas source). The thread 446 is formed on and extends helically along an internal surface of the ratchet 438 that defines an inner opening 450 of the ratchet 438, as shown in FIG. 4I. The upper engaging portion 412u of the gas source 412 of FIG. 4D (or other gas source) is configured to be inserted into the inner opening 450, e.g., as guided by the collar 432. The external thread 428 of the gas source 412 of FIG. 4D (or other gas source) can thus be in position to threadably engage the thread 446 of the ratchet 438.

The plurality of teeth 448 of the ratchet 438 are formed on an exterior surface of the ratchet 438 and extend radially outward. The teeth 448 are located on an opposite side of the ratchet 438 from the inner opening 450 so as to extend circumferentially around the inner opening 450. The teeth 448 are configured to sequentially engage the pawl 440, e.g., the engaging end of the pawl 440. The portion of the ratchet 438 that includes the teeth 438 is therefore aligned with the opening 444 of the base 436 so as to allow the ratchet arm 440, e.g., the engaging end of the ratchet arm 440, to engage the teeth 448. The ratchet 438 includes eighteen teeth 448 in this illustrated embodiment but can include another plural number of teeth.

FIGS. 4J and 4K show one of the plurality of teeth 448a engaged with the pawl 440, e.g., the engaging end of the pawl 440, with the pawl 440 in a resting or inactive position. A leading surface 448L of the one of the teeth 448a is engaged with a surface of the pawl 440, e.g., a surface of the pawl's engaging end. Facing the leading surface 448L of the one of the teeth 448a is a trailing surface 448t of a second one of the plurality of teeth 448b that is adjacent to the tooth 448a in a counterclockwise direction. With the pawl 440, e.g., an inward surface 440i of the engaging end of the pawl 440, contacting the leading surface 448L, the pawl 440 is not in contact with the trailing surface 448t, as shown in FIGS. 4J and 4K.

The spring of the ratchet system 434 is configured to bias the pawl 440 into engagement with the ratchet 438 by applying a force (also referred to herein as a "spring force") to the pawl 440 and thus also to the ratchet 438 with which the pawl 440 is engaged, e.g., by the pawl 440 engaging the leading surface 448L of one of the ratchet's teeth 448a. The spring is configured to extend between the base 436 and the pawl 440 with the spring attached at one end to the base 436 at a spring connection area 436g and at the opposite end to the pawl 440 at a spring connection area 440g (see FIG. 4J). The spring connection area 440g of the pawl 440 is at an end of the pawl 440 opposite to the pawl's engaging end. The pivot point (e.g., where the screw 442 is located) is thus located between the pawl's spring connection area 440g and the pawl's engaging end.

The gas source 412 of FIG. 4D (or other gas source) is configured to be coupled to the carbonation system 400 by a user inserting the gas source's upper engaging end 412u upwardly into the collar 432 and rotating the gas source 412 relative to the carbonation system 400 to engage the thread 428 of the gas source 412 with the thread 446 of the carbonation system 400 (e.g., of the carbonation system's ratchet 438). In a first phase of the gas source's coupling with the carbonation system 400, the thread 428 of the gas source 412 is threadably engaging the thread 446 of the carbonation system 400 and the gas source 412 is moving upwardly relative to the carbonation system 400. In the first phase, the ratchet 438 is configured to remain stationary relative to a remainder of the ratchet system 434 and a remainder of the carbonation system 400. The pawl 440 is configured to remain in the resting or inactive position with the pawl 440 engaged with a same one of the ratchet's teeth 448 (e.g., the one of the teeth 448a shown in FIGS. 4J and 4K) in the first phase.

At some point during the gas source's rotation, the gas source 412 will have moved upwardly far enough to abut a stop surface 435s (see FIG. 4H) of a seal member 435 configured to seal against the gas source 412 (or other gas source). The stop surface 435s faces downwardly. With the gas source 412 abutting the stop surface 435s, the gas source 412 has been properly coupled to the carbonation system 400 to allow gas to exit the gas source 412 and enter the carbonation system's gas regulator. The gas source 412 abutting the stop surface 435s defines an end of the first phase of the gas source's coupling with the carbonation system 400 and a start of a second phase of the gas source's coupling with the carbonation system 400. As discussed further below, in the second phase, the ratchet 438 is configured to not be stationary relative to a remainder of the ratchet system 434 or a remainder of the carbonation system 400, and the pawl 440 is configured to engage with at least two different teeth 448 of the ratchet 438.

The user manually rotating the gas source 412 cannot visualize the gas source 412 abutting the stop surface 435s due to various components being in the way, and the user holding the gas source 412 is unlikely to be able to feel when the gas source 412 has abutted the stop surface 435s, e.g., because the user's hand is experiencing other force while turning the gas source 412, because the user is focusing on the gas source's rotation, etc. Even if the user does feel a slight difference in rotating the gas source 412 once the gas source 412 abuts the stop surface 435s, the user may not realize that this slight difference indicates proper coupling of the gas source 412 with the carbonation system 400 and/or the user may keep rotating the gas source 412 anyway to make sure that proper coupling has occurred. The user thus cannot effectively visually or tactilely verify proper coupling of the gas source 412 with the carbonation system 400. Additionally, the gas source 412 is still rotatable relative to the carbonation system 400 (e.g., the ratchet 438 thereof) after the gas source 412 abuts the stop surface 435s, so the gas source's rotation is not automatically prevented by the abutment of the gas source 412 with the stop surface 435s. The user is therefore likely to continue rotating the gas source 412 relative to the carbonation system 400 after the gas source 412 has abutted the stop surface 435s and has been properly coupled with the carbonation system 400. This rotation of the gas source 412 with the gas source 412 abutting the stop surface 435s is in the second phase of the gas source's coupling with the carbonation system 400. The gas source 412 being rotated with the gas source 412 abutting the stop surface 435s can cause one or more adverse effects, such as causing the gas source's thread 428 and/or the ratchet's thread 446 to wear away and eventually with repeated wear prevent proper threading of a gas source with the carbonation system 400, causing the seal member 435 at the stop surface 435s to wear away and thereby eventually with repeated wear prevent proper sealing between a gas source and the carbonation system 400, and/or other adverse effect(s).

The ratchet system 434 is configured to provide audible feedback to the user automatically in response to the gas source 412 being properly coupled to the carbonation system 400, e.g., at the end of the first phase of the gas source's coupling with the carbonation system 400. The audible feedback is configured to be provided automatically in the course of the gas source's coupling with the carbonation system 400. The audible feedback is configured to indicate to the user that the gas source 412 can stop being rotated, which may help prevent the adverse effect(s) of continuing to rotate the gas source 412 after proper coupling has been achieved.

The gas source 412 being rotated in the second phase while the gas source 412 is abutting the stop surface 435s causes a greater force to be exerted on the ratchet system 434, e.g., on the ratchet 438, than in the first phase while the gas source 412 is not abutting the stop surface 435s because the gas source 412 is pressing up against the stop surface 435s in the second phase. This force applied to the ratchet 438 is configured to be greater than the force applied to the pawl 440, and thus to ratchet 438, by the spring. Springs have known forces, so the particular spring with a particular force chosen for a particular carbonation system can vary based on various factors, such as size of the mating threads 428, 446, materials of the various components, etc. The particular spring force that should be used in a system can be determined experimentally by determining the force applied to a carbonation system's ratchet when a gas source has been properly coupled to the ratchet and then selecting a spring with a force greater than that experimentally determined force. In one example, the force can be about 10 kgf·cm, and the spring force can be about 15 kgf·cm. A person skilled in the art will appreciate that a value may not be precisely at a value but nevertheless considered to be about that value for any number of reasons, such as manufacturing tolerances and sensitivity of measurement equipment.

The force applied to the ratchet 438 being greater than the force applied to the pawl 440 is configured to cause the ratchet 438 to begin rotating, e.g., about an axis extending through the inner opening 450, since the force will overcome the spring force applied to the ratchet 438 via the pawl 440. The ratchet 438 is configured to rotate counterclockwise in this illustrated embodiment, but the ratchet 438 can be configured to rotate clockwise in other embodiments. The ratchet's rotation is relative to the base 436. The pawl 440 will thus move from the resting or inactive position to a moving or active position in which the pawl 440 movies from the one of the teeth 448a with which the pawl 440 was initially engaged to the second, adjacent one of the plurality of teeth 448b in a counterclockwise direction. The pawl 440 will continue moving to adjacent teeth 448 one by one as long as the ratchet 438 continues rotating, which corresponds to as long as the gas source 412 continues being rotated.

Each movement of the pawl 440 from one tooth 448 to another tooth 448 is configured to cause an audible sound, e.g., a click as the pawl "clicks" from tooth 448 to tooth 448. The audible sound signals to the user that the gas source 412 can stop being rotated since the gas source 412 has been properly coupled to the carbonation system 400. The user will thus also know to keep rotating the gas source 412 until hearing the audible sound.

During use of the carbonation system 400 with the gas source 412 properly coupled to the carbonation system 434, the ratchet 438 and the pawl 440 remain stationary.

At some point the gas source 412 may be removed from the carbonation system 400, such as when the gas source 412 has been depleted or nearly depleted of gas. To remove the gas source 412, a user rotates the gas source 412 in an opposite direction to the direction in which the gas source 412 was rotated to couple the gas source 412 to the carbonation system 400. The gas source 412 in this illustrated embodiment is thus configured to be rotated clockwise for removal. Rotating the gas source 412 unthreads the gas source's 428 thread from the ratchet's thread 446 and moves the gas source 412 downwardly relative to the carbonation system 400. During the gas source's unthreading from the ratchet 438, the pawl 440 is configured to remain engaged with a same one of the teeth 448 the pawl 440 was engaged with when the gas source 412 began being rotated for removal. An exterior surface 440e of the pawl 440 at the engaging end opposite the interior surface 440i engaged one of the teeth 448 is configured to cooperate as a lock with the trailing surface of the tooth 448 adjacent in a counterclockwise direction to the tooth 448 with which the pawl 440 is engaged. The pawl's exterior surface 440e and the tooth's trailing surface are configured to act as a lock that prevents rotation of the ratchet 438 during the gas source's removal and thus that prevents the pawl 440 from moving from one tooth 448 to at least one another tooth 448 during the gas source's removal. The ratchet 438 may begin to rotate in a same direction as the gas source 412, clockwise in this illustrated embodiment, with the gas source 412 as the gas source 412 begins to be removed from the carbonation system 400, but the pawl's exterior surface 440e and the tooth's trailing surface will abut, thereby preventing further rotation of the ratchet 438 and allowing the gas source 412 to continue being rotated for removal from the carbonation system 400.

Figure 5A:
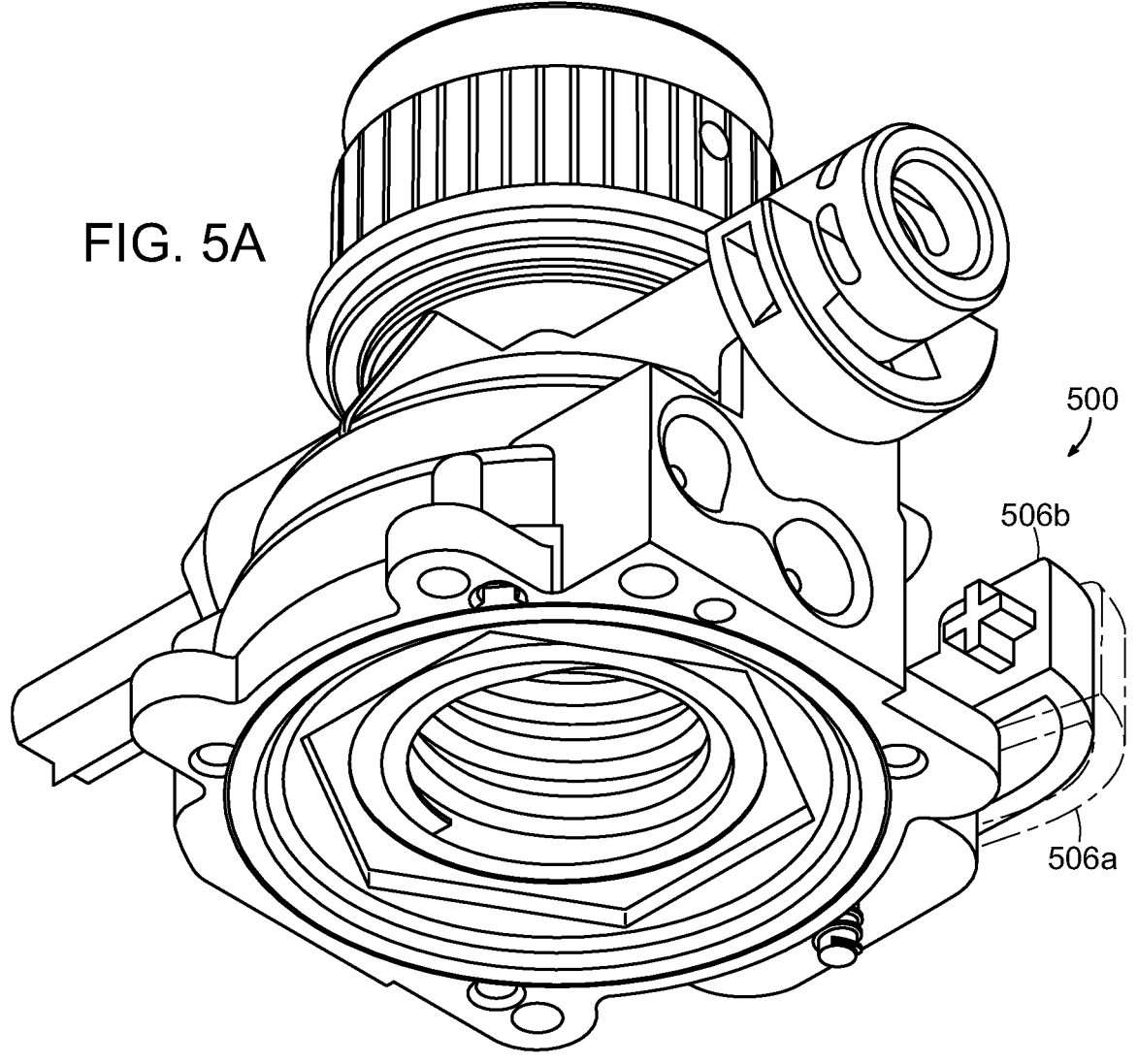
FIG. 5A is a perspective view of a portion of another embodiment of a gas source coupling assembly.
Figure 5B:
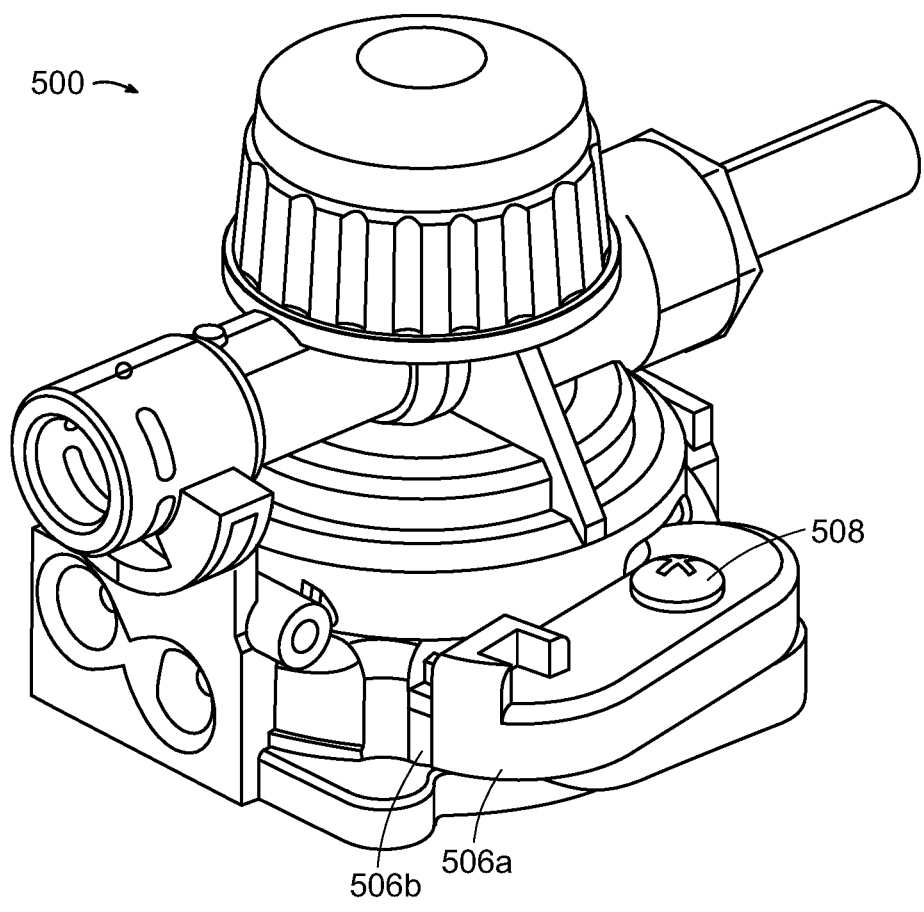
FIG. 5B is another perspective view of the portion of the gas source coupling assembly of FIG. 5A.

FIGS. 5A and 5B illustrate another embodiment of a gas source coupling assembly 500 including a ratchet system configured to automatically provide audible feedback to a user in response to a gas source (e.g., the gas source 112 of FIG. 1, the gas source 212 of FIG. 2, the gas source 412 of FIG. 4D, or other gas source) being properly coupled to a carbonation system (e.g., the carbonation system 100 of FIG. 1, the carbonation system 200 of FIG. 2, the carbonation system 300 of FIGS. 3A-3B, or other carbonation system) that includes the gas source coupling assembly 500. The gas source coupling assembly 500 of FIGS. 5A and 5B is generally configured and used similar to the gas source coupling assembly 430 of FIGS. 4E-4H and includes a gas regulator, a collar (not shown in FIGS. 5A and 5B), and a ratchet system. The ratchet system of the embodiment of FIGS. 5A and 5B is generally configured and used similar to the ratchet system 434 of FIG. 4G and includes a base 502, a ratchet 504, a pawl (also referred to herein as a "ratchet arm"), a seal member (obscured in FIGS. 5A and 5B), and a spring (obscured in FIGS. 5A and 5B).

Figure 5C:
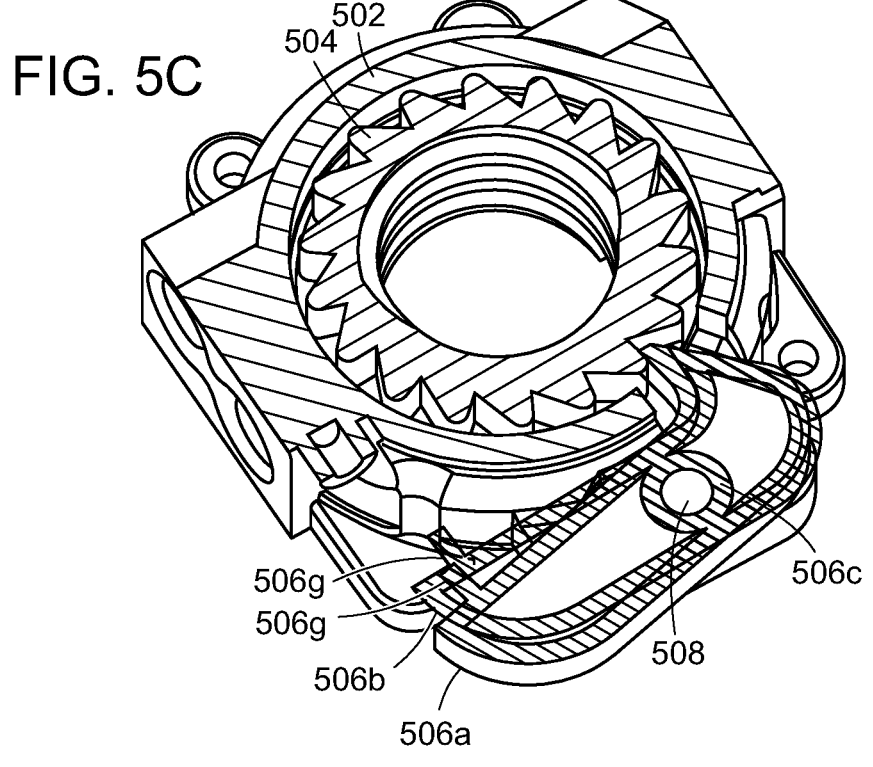
FIG. 5C is a cross-sectional perspective view of the gas source coupling assembly of FIG. 5A.
Figure 5D:
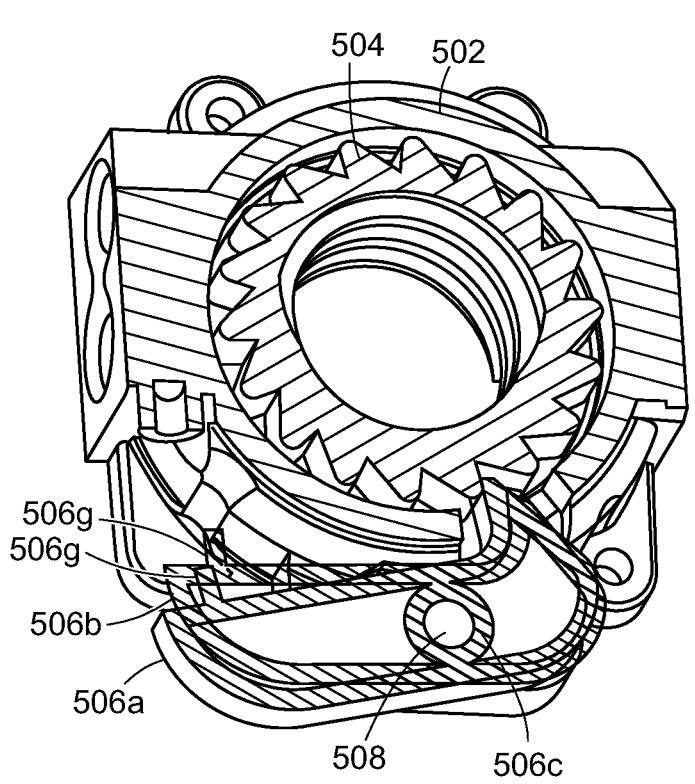
FIG. 5D is another cross-sectional perspective view of the gas source coupling assembly of FIG. 5A.

In this illustrated embodiment, the pawl is hollow, as shown in FIGS. 5C and 5D, and includes an internal connection area 506c with which a screw 508 is mated to pivotally attach the pawl to the base 502. As mentioned above, the pawl can be pivotally attached to the base 502 in another way. FIGS. 5A-5D show the pawl in a resting or inactive position (pawl labeled 506a) and in a moving or active position (pawl labeled 506b). As discussed above, the pawl is in only one of the resting or inactive position and the moving or active position at a time. FIGS. 5C and 5D also show that the pawl's spring connection area 506g has a different configuration that the spring connection area 440g of the pawl 440 of FIG. 4J. The pawl's spring connection area 440g of FIG. 4J is wider than the pawl's spring connection area 506g of FIGS. 5C and 5D.

Figures 6A, 6B:
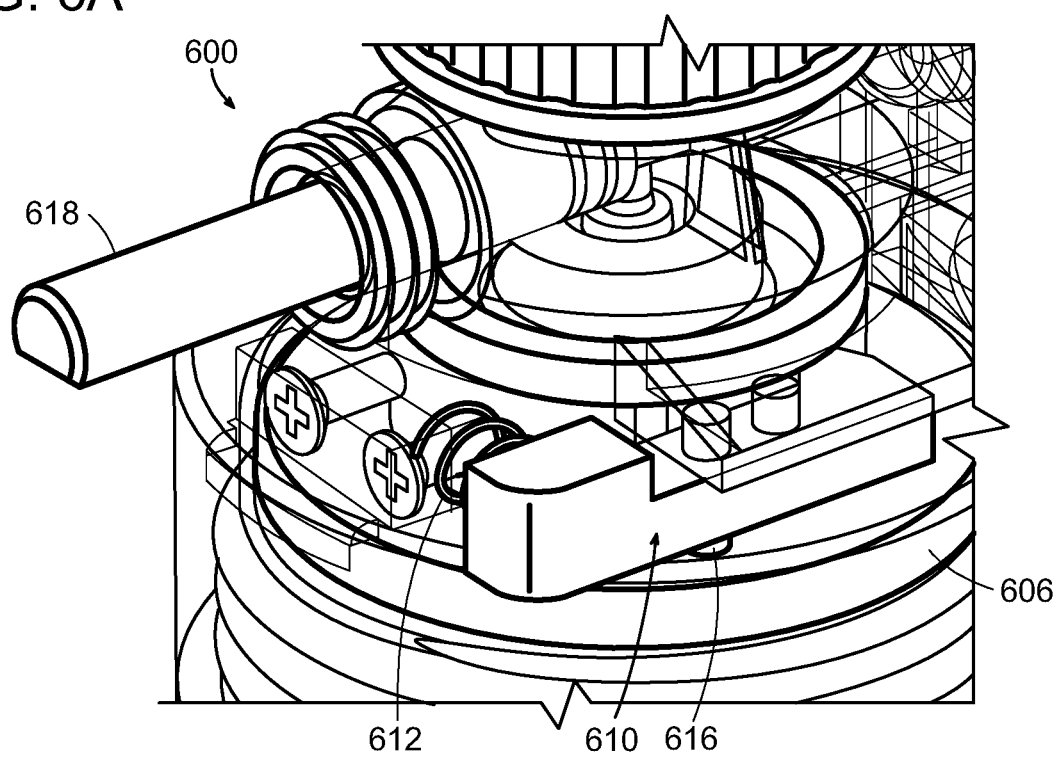
FIG. 6A is a perspective view of a portion of yet another embodiment of a gas source coupling assembly.
FIG. 6B is a cross-sectional top view of the gas source coupling assembly of FIG. 6A and the gas source of FIG. 4D coupled thereto.
Figure 6C:
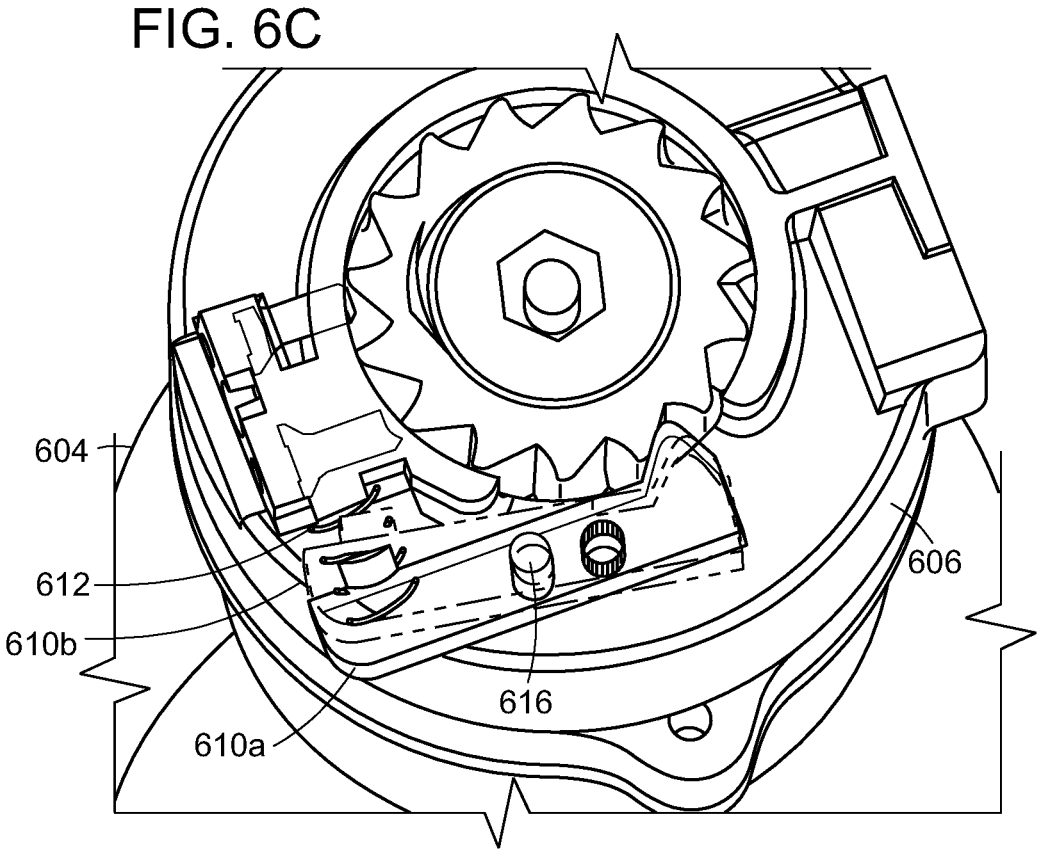
FIG. 6C is a cross-sectional perspective view of a portion of the gas source coupling assembly and the gas source of FIG. 6B.
Figure 6D:
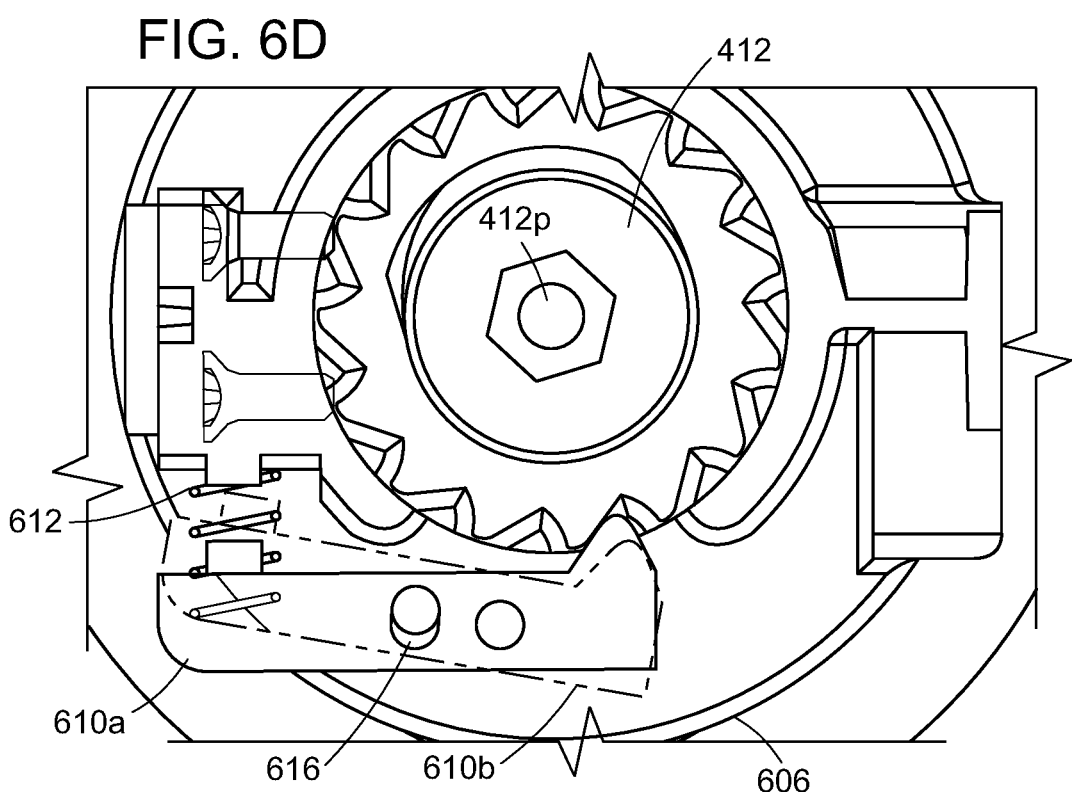
FIG. 6D is a top cross-sectional perspective view of a portion of the gas source coupling assembly and the gas source of FIG. 6B.
Figure 6E:
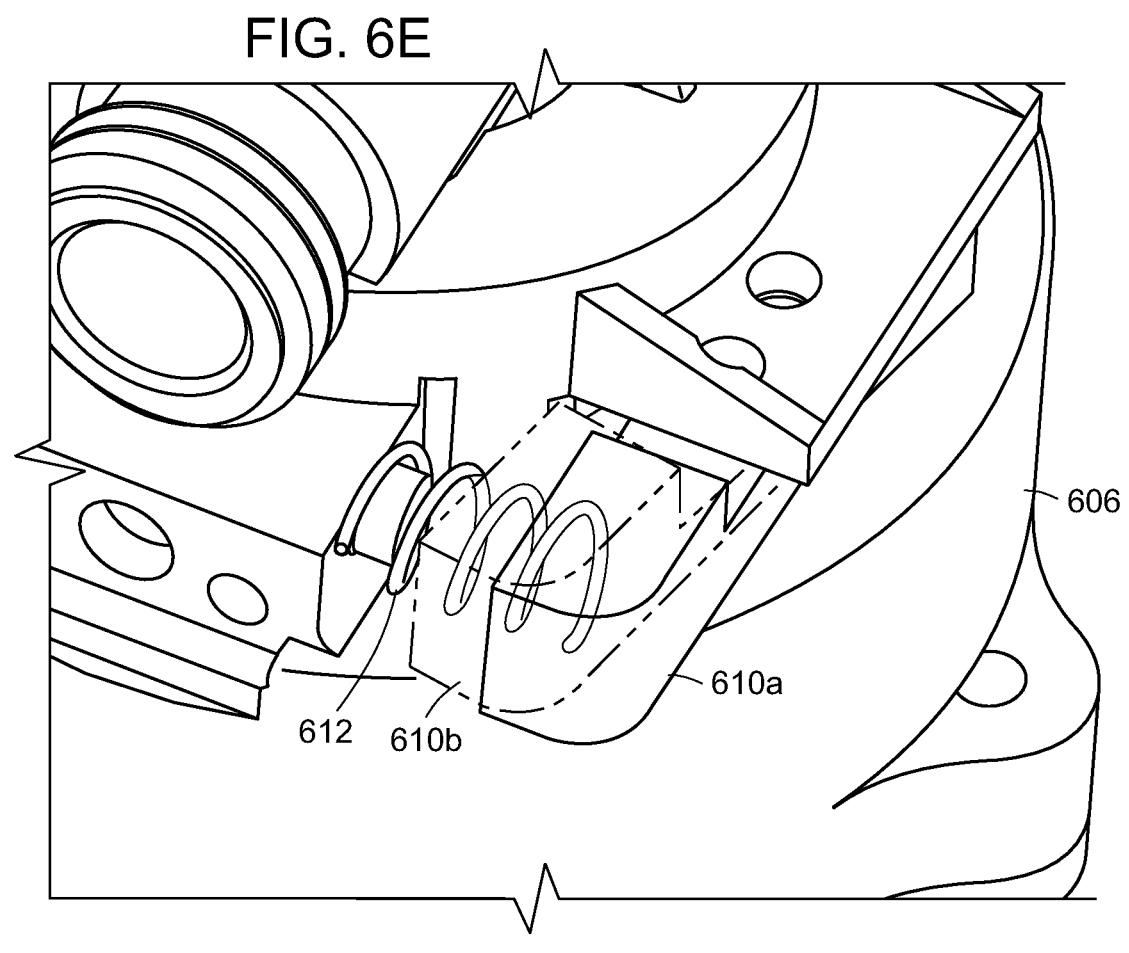
FIG. 6E is a perspective view of a portion of the gas source coupling assembly of FIG. 6B.

FIG. 6A illustrates another embodiment of a gas source coupling assembly 600 including a ratchet system configured to automatically provide audible feedback to a user in response to a gas source (e.g., the gas source 112 of FIG. 1, the gas source 212 of FIG. 2, the gas source 412 of FIG. 4D, or other gas source) being properly coupled to a carbonation system (e.g., the carbonation system 100 of FIG. 1, the carbonation system 200 of FIG. 2, the carbonation system 300 of FIGS. 3A-3B, or other carbonation system) that includes the gas source coupling assembly 600. The gas source coupling assembly 600 of FIG. 6A is generally configured and used similar to the gas source coupling assembly 430 of FIGS. 4E-4H and includes a gas regulator 602 (see FIG. 6G), a collar 604 (see FIGS. 6B, 6C, 6F, and 6G), a seal member 605, and a ratchet system. FIGS. 6B-6D, 6F, and 6G show the ratchet system properly coupled to the gas source 412 of FIG. 4D. The ratchet system of the embodiment of FIG. 6A is generally configured and used similar to the ratchet system 434 of FIG. 4G and, as variously shown in FIGS. 6A-6G, includes a base 606, a ratchet 608, a pawl (also referred to herein as a "ratchet arm") 610, and a spring 612. FIGS. 6A-E show the pawl 610 in a resting or inactive position (with the pawl 610 labeled 610a in FIGS. 6C-6E), and FIGS. 6C-6E show the pawl 610 in a moving or active position (with the pawl 610 labeled 610b in FIGS. 6C-6E). FIG. 6B illustrates a counterclockwise (CW) rotation of the ratchet 608 with an arrow A2, during which rotation the pawl 610 is moving to sequentially engage teeth 614 of the ratchet 608 as discussed above. FIG. 6B also shows the pawl 610 pivotally attached to the base 606 with a non-threaded pin 616, but as mentioned above, the pawl 610 can be pivotally attached to the base 606 in another way. The spring 612 is a compression spring in this illustrated embodiment.

Figure 6F:
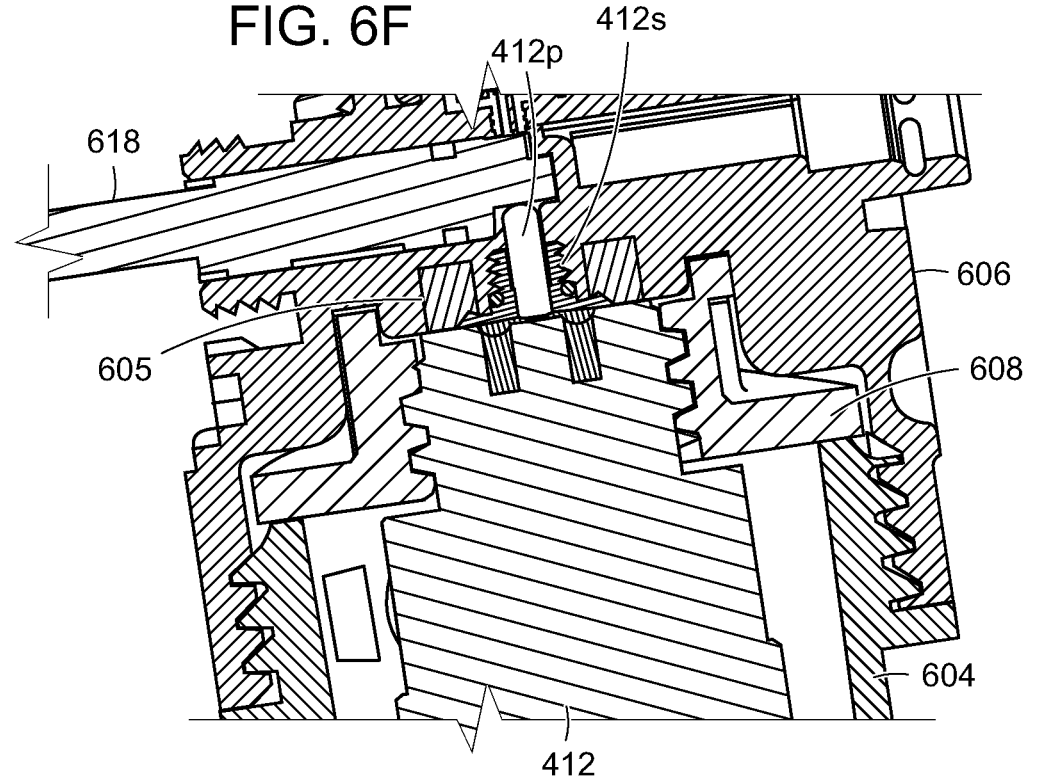
FIG. 6F is a cross-sectional perspective view of a portion of the gas source coupling assembly and the gas source of FIG. 6B.
Figure 6G:
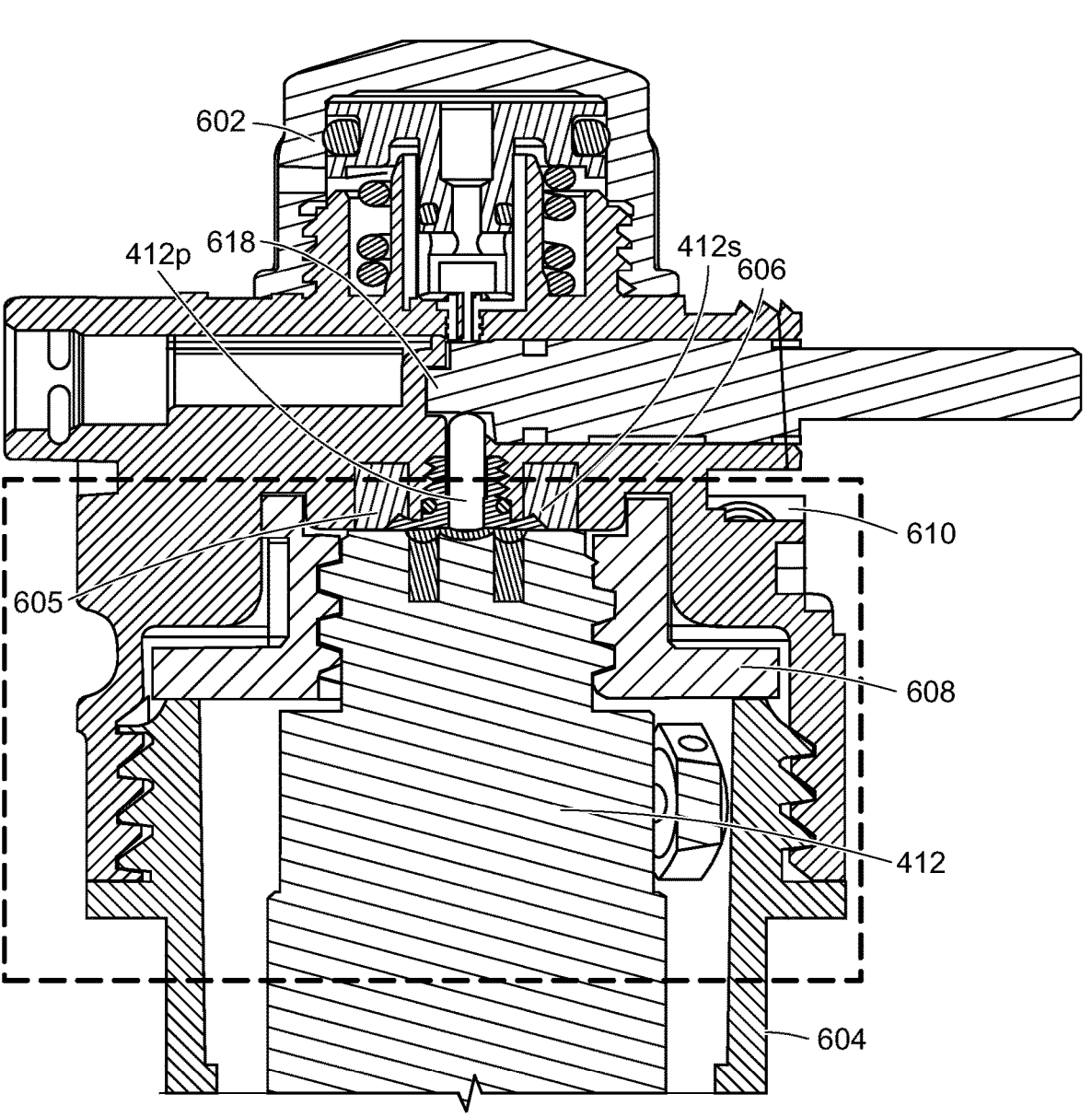
FIG. 6G is a cross-sectional side view of a portion of the gas source coupling assembly and the gas source of FIG. 6B.

In this illustrated embodiment, the carbonation system includes a motor (not shown) and a drive member 618 (see FIGS. 6A, 6F, and 6G) operably coupled to the motor and configured to be driven by the motor. The drive member 618 is configured to be operably coupled to the gas source 412, as shown in FIGS. 6F and 6G, with the gas source 412 properly coupled to the carbonation system. The motor is configured to drive the drive member 618 to move relative to the gas source 412, thereby causing the gas source 412 to open or close by the gas source's pin 412p moving down (to open the gas source 412) or up (to close the gas source 412). Whether the gas source 412 opens or closes depends on a direction of rotation of the drive member 618 relative to the gas source 412. Thus, the motor driving the drive member 618 to rotate in a first direction relative to the gas source 412 is configured to cause the gas source 412 to open, and the motor driving the drive member 618 to rotate in a second, opposite direction relative to the gas source 412 is configured to cause the gas source 412 to close. The gas source 412 can thus be selectively opened or closed. FIGS. 6F and 6G also illustrate a seal 412s of the gas source 412 surrounding the gas source's pin 412p to help ensure that no gas can exit the gas source 412 with the pin 412p in its upper position in which the gas source 412 is closed. Other carbonation systems described herein can similarly include a motor and drive member. Various embodiments of drive members are described further in U.S. patent application Ser. No. 18/099, 712 entitled "Selectively Releasing Carbon Dioxide From A Gas Source In A Carbonation System" filed Jan. 20, 2023, which is hereby incorporated by reference in its entirety.

Figure 7:
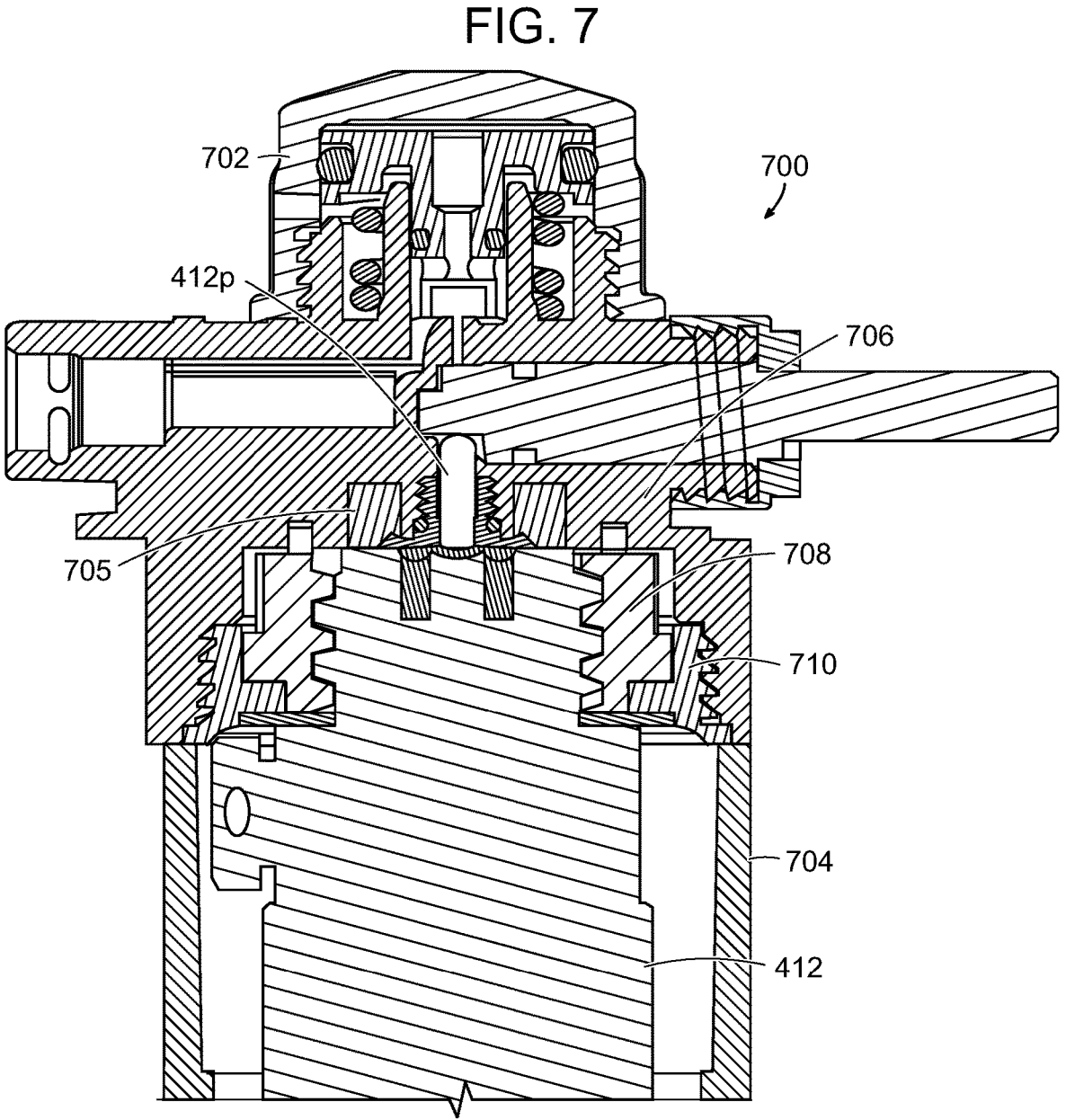
FIG. 7 is a cross-sectional side view of another embodiment of a gas source coupling assembly coupled to the gas source of FIG. 4D.

FIG. 7 illustrates another embodiment of a gas source coupling assembly 700 including a ratchet system configured to automatically provide audible feedback to a user in response to a gas source (e.g., the gas source 112 of FIG. 1, the gas source 212 of FIG. 2, the gas source 412 of FIG. 4D, or other gas source) being properly coupled to a carbonation system (e.g., the carbonation system 100 of FIG. 1, the carbonation system 200 of FIG. 2, the carbonation system 300 of FIGS. 3A-3B, or other carbonation system) that includes the gas source coupling assembly 700. FIG. 7 shows the ratchet system properly coupled to the gas source 412 of FIG. 4D. The gas source coupling assembly 700 of FIG. 7 is generally configured and used similar to the gas source coupling assembly 430 of FIGS. 4E-4H and includes a gas regulator 702, a collar 704, a seal member 705, and a ratchet system. The ratchet system of the embodiment of FIG. 7 is generally configured and used similar to the ratchet system 434 of FIG. 4G and includes a base 706, a ratchet 708, a nut 710, a pawl (obscured in FIG. 7), and a spring (obscured in FIG. 7). In this illustrated embodiment, the ratchet 708 is coupled to the base 706 via the nut 710, which is threadably engaged with the base 706.

Figure 8A:
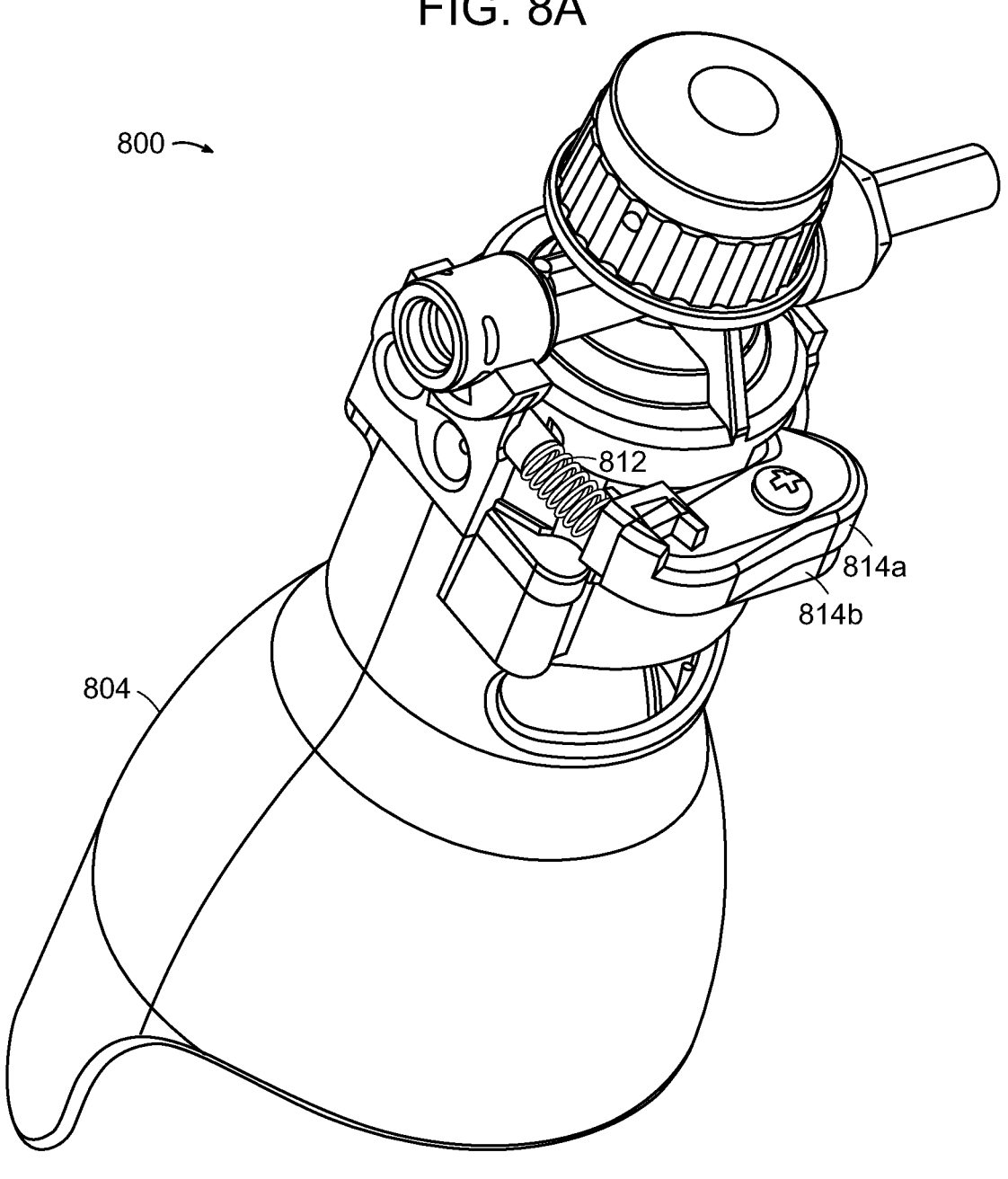
FIG. 8A is a perspective view of another embodiment of a gas source coupling assembly.
Figure 8B:
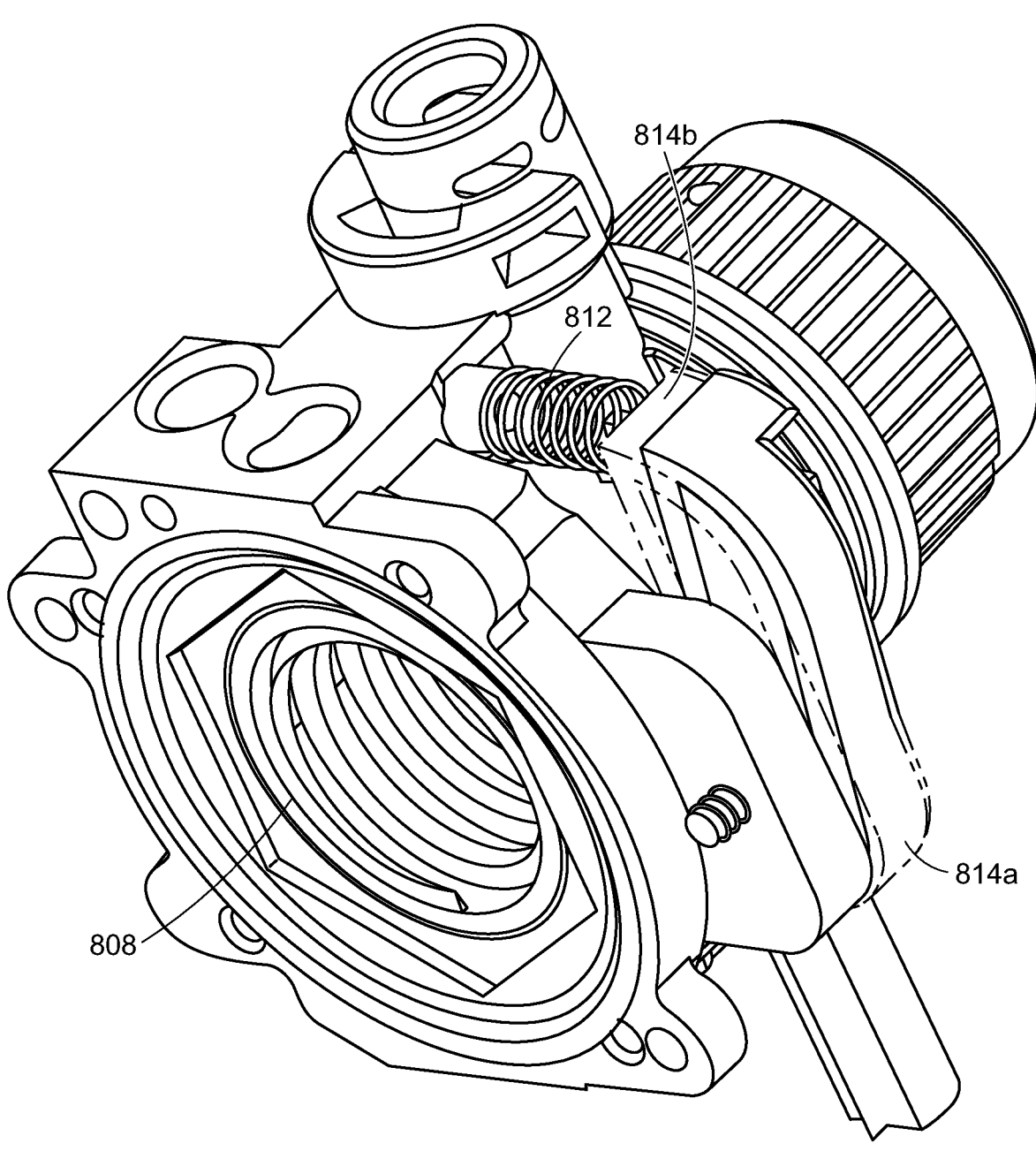
FIG. 8B is a perspective view of a portion of the gas source coupling assembly of FIG. 8A.
Figure 8C:
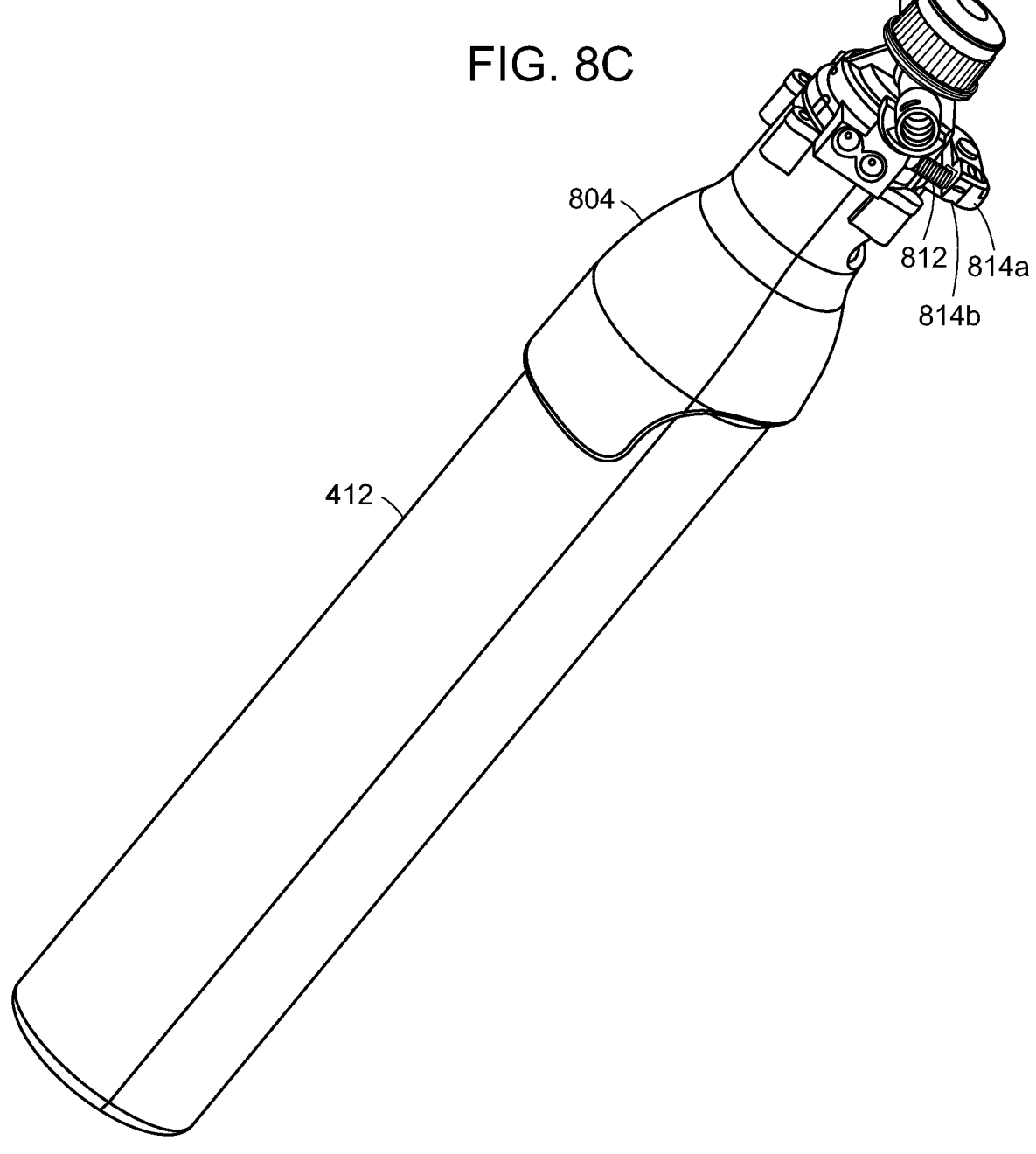
FIG. 8C is a perspective view of a portion of the gas source coupling assembly of FIG. 8A coupled to the gas source of FIG. 4D.
Figure 8D:
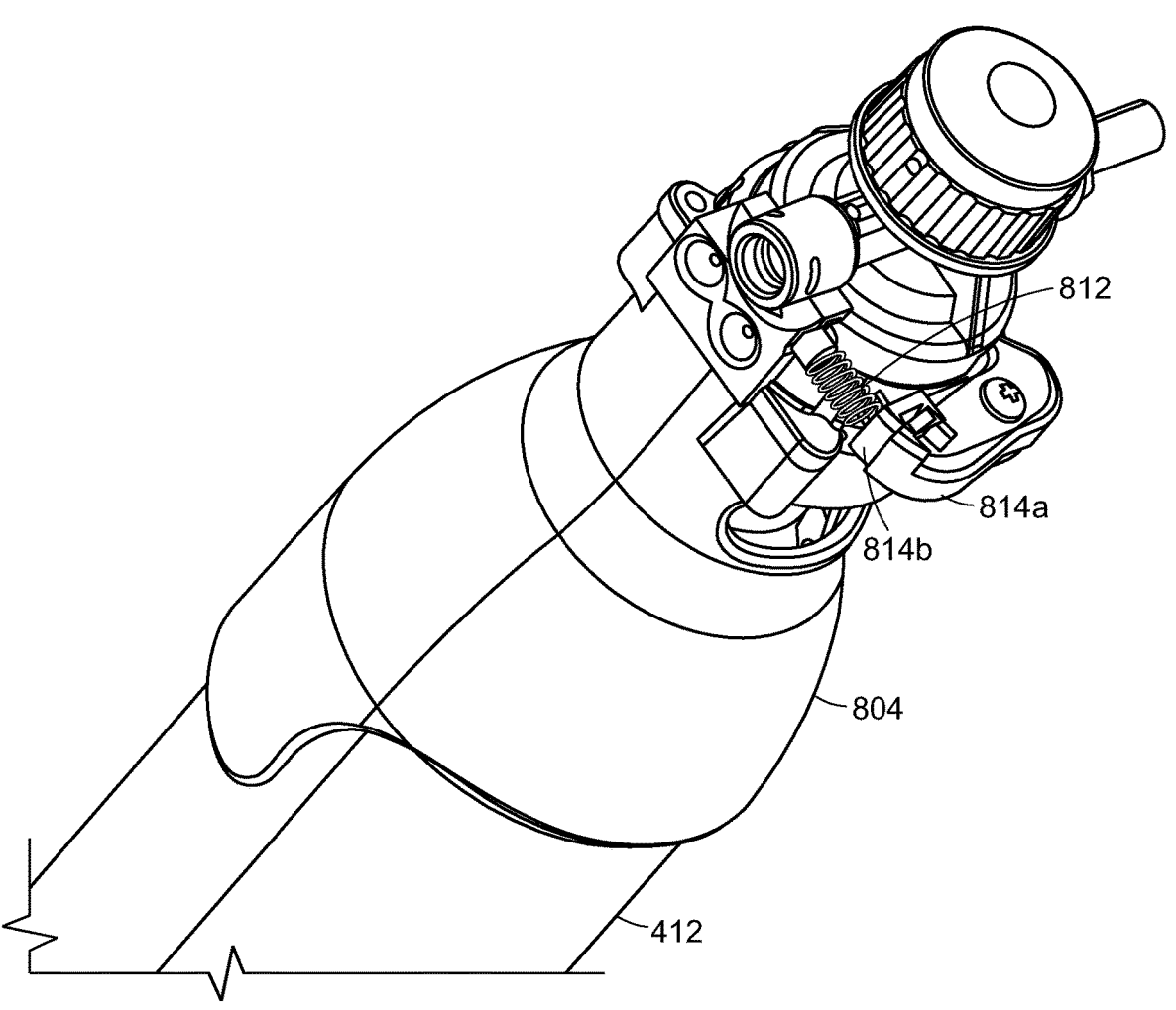
FIG. 8D is a perspective view of the gas source assembly and a portion of the gas source of FIG. 8C.
Figure 8E:
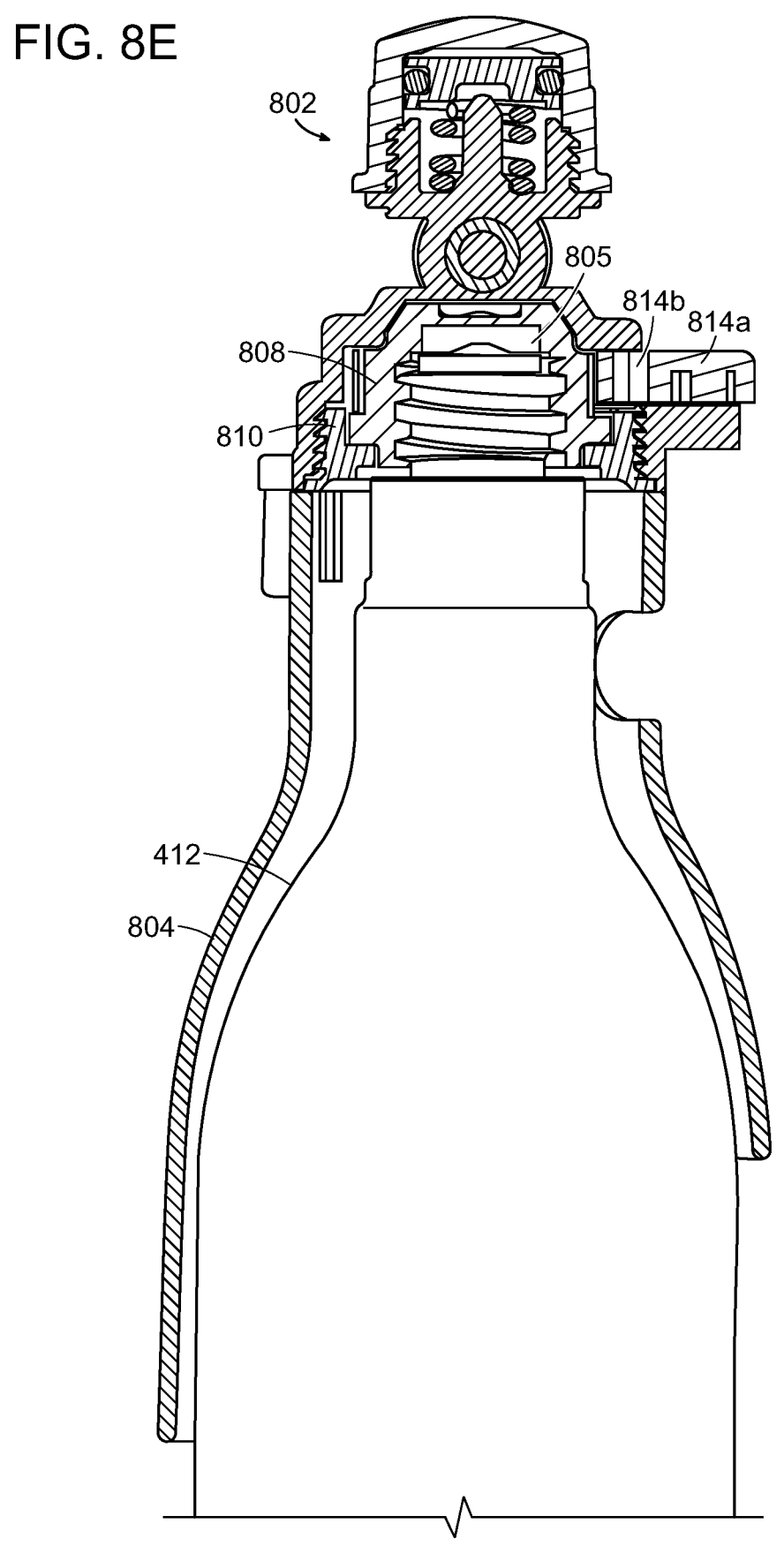
Figure 8F:
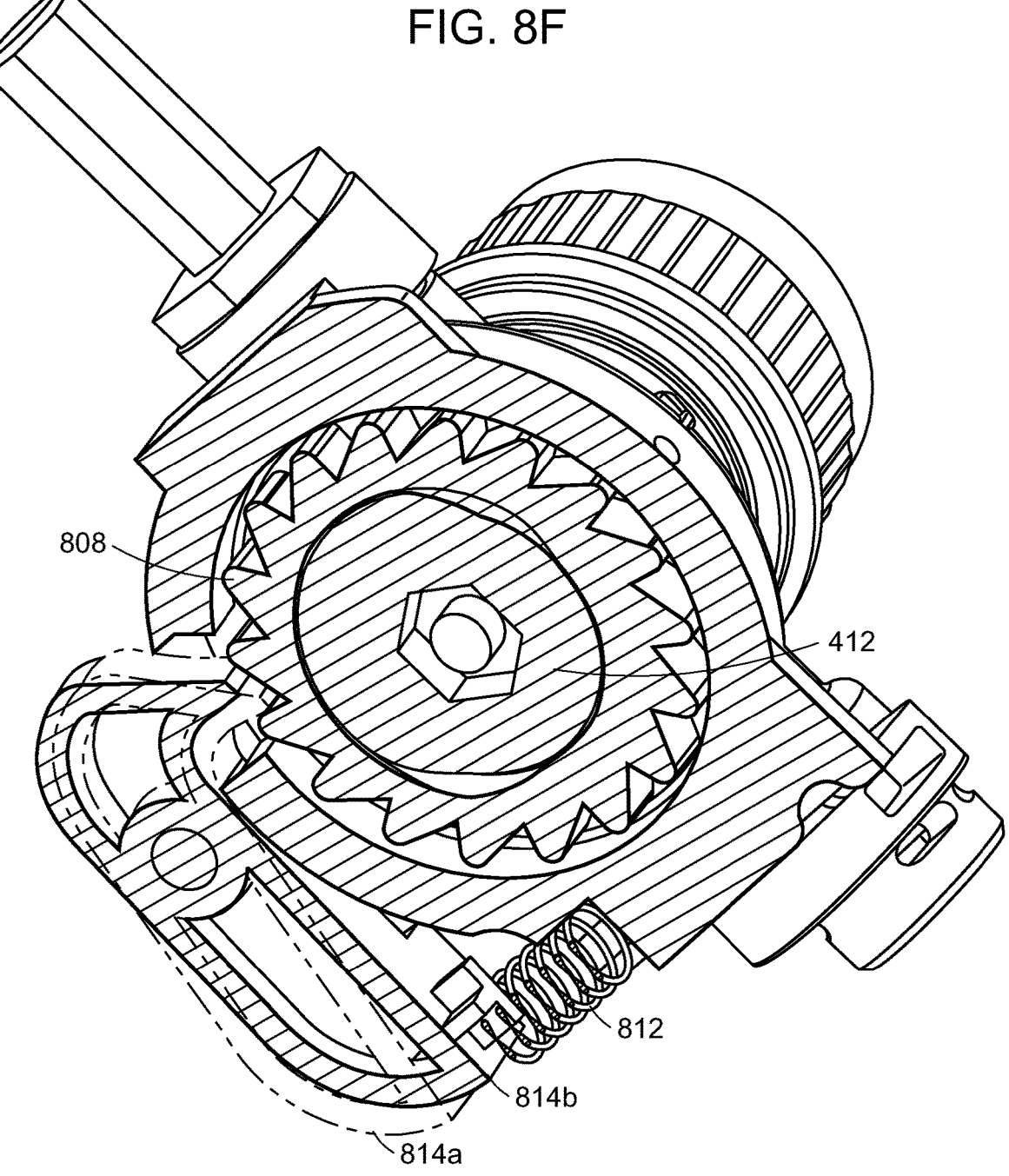
FIG. 8F is cross-sectional bottom view of the gas source assembly and the gas source of FIG. 8C.

FIGS. 8A and 8B illustrate another embodiment of a gas source coupling assembly 800 including a ratchet system configured to automatically provide audible feedback to a user in response to a gas source (e.g., the gas source 112 of FIG. 1, the gas source 212 of FIG. 2, the gas source 412 of FIG. 4D, or other gas source) being properly coupled to a carbonation system (e.g., the carbonation system 100 of FIG. 1, the carbonation system 200 of FIG. 2, the carbonation system 300 of FIGS. 3A-3B, or other carbonation system) that includes the gas source coupling assembly 800. FIGS. 8C-8F shows the ratchet system properly coupled to the gas source 412 of FIG. 4D. The gas source coupling assembly 800 of FIGS. 8A and 8B is generally configured and used similar to the gas source coupling assembly 430 of FIGS. 4E-4H and includes a gas regulator 802, a collar 804 (omitted in FIG. 8B), a seal member 805, and a ratchet system. The ratchet system of the embodiment of FIGS. 8A and 8B is generally configured and used similar to the ratchet system 434 of FIG. 4G and includes a base 806, a ratchet 808, a nut 810, a pawl, and a spring 812. In this illustrated embodiment, the ratchet 808 is coupled to the base 806 via the nut 810, which is threadably engaged with the base 806. The spring 812 is a compression spring in this illustrated embodiment. FIGS. 8A-8F show the pawl in a resting or inactive position (pawl labeled 814a) and in a moving or active position (pawl labeled 814b). As discussed above, the pawl is in only one of the resting or inactive position and the moving or active position at a time.

In this illustrated embodiment, the gas source coupling assembly 800 includes an o-ring 816 engaged with an upper portion of the ratchet 808, as shown in FIG. 8E. The ratchet 808 is configured to rotate relative to and on the o-ring 816 when the ratchet 808 is rotating during coupling with a gas source as discussed herein. The o-ring 816 is thus a dynamic o-ring. Instead of the o-ring 816, another type of sealing member can be used.

FIG. 9 illustrates one embodiment of a method 900 of removably coupling a gas source (e.g., the $CO_2$ canister 112 of FIG. 1, the $CO_2$ canister 212 of FIG. 2, the $CO_2$ canister 412 of FIG. 4D, or other gas source) to a carbonation system. The method 900 is described with respect to the carbonation system 400 of FIGS. 4A-4C for ease of explanation but can be similarly performed with respect to another carbonation system (e.g., the carbonation system 100 of FIG. 1, the carbonation system 200 of FIG. 2, the carbonation system 300 of FIG. 3, the carbonation system including the gas source coupling assembly 500 of FIGS. 5A and 5B, the carbonation system including the gas source coupling assembly 600 of FIG. 6A, or other carbonation system). Additionally, as mentioned above, the method 900 may also be implemented for a treatment system that is not a carbonation system.

The method 900 includes a user rotating 902 the gas source 412 relative to the ratchet 438 such that the thread 428 of the gas source 412 threadably engages with the thread 446 of the ratchet 438. During the threading of the threads 428, 446, the pawl 440 remains engaged with the one 448a of the ratchet's teeth 448 (see FIGS. 4J and 4K) under the biasing force of the spring, the gas source's pin 412p is in the upper position such that the gas source 412 is closed, the ratchet 438 is not rotating, and the gas source 412 moves upwardly relative to the ratchet 438. The gas source 412 is rotated 902 relative to the ratchet 438 until a force applied by the gas source 412 to the ratchet 438 overcomes 904 the biasing force applied to the pawl 440, thereby causing the ratchet 438 to begin rotating 906 with the gas source 412 such that the pawl 440 moves to at least a second one of the ratchet's plurality of teeth 448 and creates 908 a sound audible to the user rotating 902 the gas source 412. The sound continues being created 908 as the pawl 440 clicks from one tooth 448 to another tooth 448 until the gas source 412 stops 910 being rotated such that the ratchet 438 also stops rotating. The gas source 412, being properly coupled to the carbonation system 400, is thus ready for use 912 by the carbonation system 400 in creating any number of beverages. At a user's discretion, e.g., when the gas source 412 is empty or nearly empty, the user rotates 914 the gas source 412 relative to the ratchet 438 to release the gas source 412 from the carbonation system 400. The gas source 412 can then be refilled before being again coupled to the carbonation system 400, or a different gas source can be coupled to the carbonation system 400.

One skilled in the art will appreciate further features and advantages of the devices, systems, and methods based on the above-described embodiments. Accordingly, this disclosure is not to be limited by what has been particularly shown and described, except as indicated by the appended claims. All publications and references cited herein are expressly incorporated herein by reference in their entirety for all purposes.

The present disclosure has been described above by way of example only within the context of the overall disclosure provided herein. It will be appreciated that modifications within the spirit and scope of the claims may be made without departing from the overall scope of the present disclosure.

What is claimed is:

1. A beverage system, comprising:

a spring;

a pawl operatively coupled to the spring such that the spring applies a first force to the pawl; and a ratchet including a plurality of teeth, the ratchet being configured to engage with a gas source containing a gas therein for formation of a beverage, and the plurality of teeth being configured to engage the pawl;

wherein the pawl is configured to remain engaged with a first one of the plurality of teeth during the engagement of the ratchet with the gas source until a second force applied to the ratchet overcomes the first force, thereby causing the pawl to move to at least a second one of the plurality of teeth; and the movement of the pawl from engaging the first one of the plurality of teeth of the ratchet to engaging at least the second one of the plurality of teeth creates a sound audible to a user engaging the gas source with the thread of the ratchet.

2. The beverage system of claim 1, wherein the ratchet is configured to begin rotating in response to the second force overcoming the first force.

3. The beverage system of claim 1, wherein the ratchet includes a thread, engaging the ratchet with the gas source includes threadably engaging the thread with the gas source, the thread is on an internal surface of the ratchet, and the plurality of teeth are on an external surface of the ratchet.

4. The beverage system of claim 1, further comprising a base to which the pawl is pivotally attached.

5. The beverage system of claim 1, wherein the pawl is configured to move from engaging the first one of the plurality of teeth of the ratchet to engaging at least the second one of the plurality of teeth only with the thread of the ratchet fully threadably engaged with the gas source.

6. The beverage system of claim 5, wherein the ratchet includes a thread, engaging the ratchet with the gas source includes threadably engaging the thread with the gas source, and, with the thread of the ratchet fully threadably engaged with the gas source, the gas contained in the gas source is configured to be released therefrom for the formation of the beverage.

7. The beverage system of claim 1, wherein the ratchet is configured to disengage from the gas source engaged therewith such that the ratchet is engageable again with the gas source or is engageable with a second gas source.

8. The beverage system of claim 1, wherein the gas source is a carbon dioxide canister containing carbon dioxide therein.

9. The beverage system of claim 1, further comprising the gas source.

10. The beverage system of claim 9, wherein the ratchet includes a thread, engaging the ratchet with the gas source includes threadably engaging the thread with the gas source, and the gas source is configured to apply the second force to the ratchet only once the gas source has been fully threaded with the thread of the ratchet.

11. The beverage system of claim 10, wherein the gas contained in the gas source is pressurized;

the gas source includes a pin configured to move from an extended position, in which the gas source is closed such that the gas contained in the gas source cannot be released from the gas source, and a compressed position, in which the gas source is open such that the gas contained in the gas source can be released from the gas source; and the pin is configured to move from the extended position to the compressed position in response to the gas source being fully threaded with the thread of the ratchet.

12. The beverage system of claim 9, wherein the ratchet includes a thread, engaging the ratchet with the gas source includes threadably engaging the thread with the gas source, and an upper portion of the gas source is configured to threadably engage the thread of the ratchet such that the gas source moves upward relative to the ratchet; and the gas source is configured to begin applying the second force to the ratchet in response to the gas source being threadably engaged with the thread of the ratchet and moved as far upward as possible.

13. The beverage system of claim 9, wherein the ratchet includes a thread, engaging the ratchet with the gas source includes threadably engaging the thread with the gas source, and the gas source being threadably engaged with the thread of the ratchet includes the gas source being rotated relative to the ratchet; and the ratchet is configured to begin rotating with the gas source in response to the second force being applied to the ratchet.

14. A method for a beverage system, comprising:

engaging the ratchet of the beverage system of claim 1 with the gas source until the second force applied to the ratchet overcomes the first force, thereby causing the pawl of the beverage system of claim 1 to move to at least the second one of the plurality of teeth and create the audible sound.

15. The method of claim 14, further comprising disengaging the ratchet from the gas source and, thereafter, engaging the ratchet with a second gas source until a third force applied to the ratchet overcomes the first force, thereby causing the pawl to move to at least the second one of the plurality of teeth and create the audible sound.

16. A method for a beverage system, comprising:

rotating a gas source relative to a ratchet of a beverage system such that the gas source engages with the ratchet, the gas source containing a pressurized gas therein configured to be selectively released from the gas source to allow the beverage system to form a beverage using the released gas and to dispense the beverage;

wherein the gas source rotates relative to the ratchet until a force applied by the gas source to the ratchet overcomes a biasing force applied to a pawl engaged with one of a plurality of teeth of the ratchet, thereby causing the ratchet to begin rotating with the gas source such that the pawl moves to at least a second one of the plurality of teeth and creates a sound audible to a user rotating the gas source.

17. The method of claim 16, further comprising disengaging the gas source from the ratchet and, thereafter, rotating a second gas source relative to the ratchet such that the second gas source engages with the ratchet, the second gas source containing a second pressurized gas therein configured to be selectively released from the second gas source to allow the beverage system to form a second beverage using the released second gas and to dispense the second beverage;

wherein the second gas source rotates relative to the ratchet until a second force applied by the second gas source to the ratchet overcomes the biasing force applied to the pawl, thereby causing the ratchet to begin rotating with the second gas source such that a second sound audible is created.

18. The method of claim 16, further comprising disengaging the gas source from the ratchet;

wherein the gas source is rotated in a first direction; and the disengaging includes rotating the gas source in second direction relative to the ratchet, the second direction being opposite to the first direction.

19. The method of claim 16, wherein a spring applies the force to the pawl.

20. The method of claim 16, wherein the gas source is a carbon dioxide canister containing carbon dioxide therein.

* * * * *